US012739839B2

(12) United States Patent
Choi et al.

(10) Patent No.: US 12,739,839 B2
(45) Date of Patent: Sep. 15, 2026

(54) CROSS SLOT SCHEDULING METHOD AND DEVICE IN WIRELESS COMMUNICATION SYSTEM

(71) Applicant: Samsung Electronics Co., Ltd., Suwon-si (KR)

(72) Inventors: Seunghoon Choi, Suwon-si (KR); Taehyoung Kim, Suwon-si (KR); Jinkyu Kang, Suwon-si (KR); Youngbum Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 567 days.

(21) Appl. No.: 17/762,250

(22) PCT Filed: Sep. 25, 2020

(86) PCT No.: PCT/KR2020/013131

§ 371 (c)(1), (2) Date: Mar. 21, 2022

(87) PCT Pub. No.: WO2021/060935

PCT Pub. Date: Apr. 1, 2021

(65) Prior Publication Data

US 2022/0353893 A1 Nov. 3, 2022

(30) Foreign Application Priority Data

Sep. 26, 2019 (KR) ........................ 10-2019-0119068
Oct. 16, 2019 (KR) ........................ 10-2019-0128777

(Continued)

(51) Int. Cl.
*H04W 72/23* (2023.01)

(52) U.S. Cl.
CPC .................................. *H04W 72/23* (2023.01)

(58) Field of Classification Search
CPC ................. H04W 72/23; H04W 72/12; H04W 52/0216; H04W 52/0229; H04W 52/0258;
(Continued)

(56) References Cited

U.S. PATENT DOCUMENTS 9,054,961 B1 * 6/2015 Kim ...................... H04W 12/08
9,538,524 B2 1/2017 Han et al.
(Continued)

FOREIGN PATENT DOCUMENTS

CN 105897691 A * 8/2016 ......... H04L 63/0876
CN 106507437 A * 3/2017 ............ H04W 84/12
(Continued)

OTHER PUBLICATIONS

Extended European Search Report dated Oct. 7, 2022, issued in European Patent Application No. 20868837.4-1215.
(Continued)

*Primary Examiner* — Shean Tokuta
(74) *Attorney, Agent, or Firm* — Jefferson IP Law, LLP

(57) ABSTRACT

Disclosed are a communication technique for merging, with IoT technology, a 5G communication system for supporting a data transmission rate higher than that of a 4G system, and a system therefor. The present disclosure can be applied to intelligent services (for example, smart home, smart building, smart city, smart car or connected car, healthcare, digital education, retail, security, and safety-related services, and the like) on the basis of 5G communication technology and IoT-related technology. In addition, the present disclosure provides a method and a device for reducing terminal power consumption in a wireless communication system. A method of a terminal in a communication system, according to one embodiment of the present disclosure, comprises the steps of receiving, from a base station, downlink control information (DCI) including a minimum offset indication field that (Continued)

indicates a first minimum offset, confirming an application delay for applying the first minimum offset, and transmitting/receiving data to/from the base station on the basis of the first minimum offset after the application delay from the time when the DCI had been received, wherein, during the application delay from the time when the DCI had been received, DCI including a minimum offset indication field that indicates a minimum offset different from the first minimum offset cannot be received from the base station.

11 Claims, 15 Drawing Sheets

(30) Foreign Application Priority Data

Apr. 10, 2020 (KR) ........................ 10-2020-0044217
Apr. 22, 2020 (KR) ........................ 10-2020-0048742
May 15, 2020 (KR) ........................ 10-2020-0058530

(58) Field of Classification Search
CPC ..... H04L 5/0053; H04L 5/0007; H04L 5/001; H04L 5/0094
See application file for complete search history.

(56) References Cited

U.S. PATENT DOCUMENTS 10,609,581 B2* 3/2020 Lee ........................ H04W 12/08
10,880,817 B2* 12/2020 Wang .................... H04W 48/16
11,375,518 B2* 6/2022 Lin ........................ H04W 76/28
12,349,063 B2* 7/2025 Kim ...................... H04W 72/23
2010/0004021 A1* 1/2010 Lin ........................ H04W 48/18 455/552.1
2014/0045536 A1* 2/2014 Sydir .................... H04W 4/021 455/456.5
2014/0304770 A1* 10/2014 Jung ................... H04W 12/122 726/2
2015/0141005 A1* 5/2015 Suryavanshi ......... H04W 12/06 455/434
2016/0029151 A1* 1/2016 Hara ........................ H04B 5/20 455/41.1
2016/0072806 A1* 3/2016 Kim ...................... H04W 12/50 726/5
2016/0315859 A1* 10/2016 Buesker .............. H04L 61/5007
2016/0353269 A1* 12/2016 Kasslin ................. H04L 67/303
2017/0085566 A1* 3/2017 Kim .................... H04L 63/0876
2017/0126499 A1* 5/2017 Salkintzis ............. H04L 67/563
2018/0227156 A1* 8/2018 Papasakellariou .......................... H04L 27/2613
2018/0367263 A1* 12/2018 Ying ..................... H04L 1/1854
2019/0052476 A1* 2/2019 Shu ......................... H04W 4/70
2019/0166066 A1* 5/2019 Ang ...................... H04L 5/0078
2019/0223248 A1* 7/2019 Chandran ........... H04L 12/2803
2019/0246346 A1* 8/2019 Huang ................ H04L 12/2838
2019/0335519 A1* 10/2019 Ohkubo ................ H04W 76/14
2020/0007700 A1* 1/2020 Miyakawa ............ G06F 3/1236
2020/0029315 A1* 1/2020 Lin ................... H04W 52/0216
2020/0107345 A1* 4/2020 Ang .................. H04W 72/1273
2020/0111117 A1* 4/2020 Xiao .................... G06Q 20/401
2020/0136902 A1* 4/2020 Wang .................. H04L 63/0876
2020/0213936 A1* 7/2020 Fan ....................... H04W 48/18
2020/0374918 A1* 11/2020 Ang ...................... H04L 5/0007
2021/0050985 A1* 2/2021 Ang ...................... H04W 72/23
2022/0174601 A1* 6/2022 Chen .................... H04B 7/0413
2022/0345576 A1* 10/2022 Suzaki ............... H04N 1/00503
2022/0353893 A1* 11/2022 Choi ........................ H04L 5/001
2023/0068641 A1* 3/2023 Lu ......................... H04W 76/10
2023/0093016 A1* 3/2023 Shi .......................... H04L 41/12 370/329
2023/0129637 A1* 4/2023 Tzoreff ................. H04W 76/19 709/227
2023/0291799 A1* 9/2023 Li ......................... H04W 40/24
2023/0337147 A1* 10/2023 Xu ........................ H04W 4/023
2024/0089959 A1* 3/2024 Ma ...................... H04W 72/232

FOREIGN PATENT DOCUMENTS

CN 106600262 A * 4/2017 ........... G06Q 20/325
CN 106973381 A * 7/2017 ............ H04W 48/16
CN 109194722 A * 1/2019 ........... H04N 1/4406
CN 109275125 A * 1/2019 ............. H04L 67/60
CN 109741585 A * 5/2019
CN 109819426 A * 5/2019 ............ H04W 48/16
CN 110012462 A * 7/2019 ............ H04W 12/06
CN 110460995 A * 11/2019 ............ H04W 76/11
CN 106507437 B * 12/2019 ............ H04W 76/14
CN 110635959 A * 12/2019 ......... H04L 41/0823
CN 107147549 B * 2/2020 ......... H04L 12/2856
CN 110971495 A * 4/2020 ............. H04L 67/12
CN 111182504 A * 5/2020 .......... H04W 12/068
CN 111246539 A * 6/2020 ......... H04L 12/2807
CN 111343055 A * 6/2020 ............ H04W 48/16
CN 111628897 A * 9/2020 ............ H04W 60/00
CN 106973381 B * 11/2020 ............ H04W 48/20
CN 114598598 A * 6/2022 ......... H04L 41/0889
EP 3605955 A1 * 2/2020 ............ H04W 76/14
EP 3 886 507 A1 9/2021
EP 4224889 A1 * 8/2023 ......... H04L 41/0806
EP 4250685 A1 * 9/2023 ......... H04L 41/0889
ES 3041317 T3 * 11/2025 ......... H04L 41/0816
KR 20140099808 A * 8/2014 .............. H04W 4/80
KR 10-2021-0010240 A 1/2021
RU 2646390 C1 * 3/2018 ............. H04L 67/51
TW 201523225 A * 6/2015
WO WO-2016013119 A1 * 1/2016 ............ H04W 76/30
WO WO-2016173178 A1 * 11/2016 ............. H04L 12/28
WO WO-2017008705 A1 * 1/2017 ............... H04L 9/40
WO WO-2017051497 A1 * 3/2017 ............ H04W 40/32
WO WO-2017193937 A1 * 11/2017 ............ H04W 8/005
WO WO-2019071522 A1 * 4/2019 ............ H04W 52/02
WO WO-2019071523 A1 * 4/2019 .............. H04M 1/73
WO WO-2020155360 A1 * 8/2020 ............ H04W 48/16
WO WO-2020223854 A1 * 11/2020 ............. G05B 19/04
WO WO-2021147686 A1 * 7/2021 ........ H04M 1/72406
WO WO-2021159708 A1 * 8/2021 ............ H04W 12/73
WO WO-2021164769 A1 * 8/2021 ............ H04W 12/50
WO WO-2022016672 A1 * 1/2022 .............. H04W 4/80
WO WO-2022105028 A1 * 5/2022 ......... H04L 41/0889
WO WO-2024022222 A1 * 2/2024 ............ H04W 12/71

OTHER PUBLICATIONS

Qualcomm Incorporated, 'Cross-slot scheduling power saving techniques', R1-1909276, 3GPP TSG RAN WG1 #98, Prague, Czech Republic, Aug. 17, 2019.
Samsung, 'Cross-slot scheduling power saving technique', R1-1908506, 3GPP TSG RAN WG1 #98, Prague, Czech Republic, Aug. 16, 2019.
Huawei et al., 'Procedure of cross-slot scheduling for UE power saving', R1-1908070, 3GPP TSG RAN WG1 #98, Prague, Czech Republic, Aug. 17, 2019.
Interdigital, Inc., 'On Cross-slot Scheduling for UE Power Saving', R1-1909037, 3GPP TSG RAN WG1 #98, Prague, Czech Republic, Aug. 17, 2019.
Mediatek Inc., Summary for Cross-Slot Scheduling Power Saving Techniques, R1-1909662, 3GPP TSG RAN WG1 #98, Prague, CZ, Sep. 3, 2019.
Korean Office Action dated Jul. 22, 2025, issued in Korean Application No. 10-2020-0058530.

* cited by examiner

FIG. 8

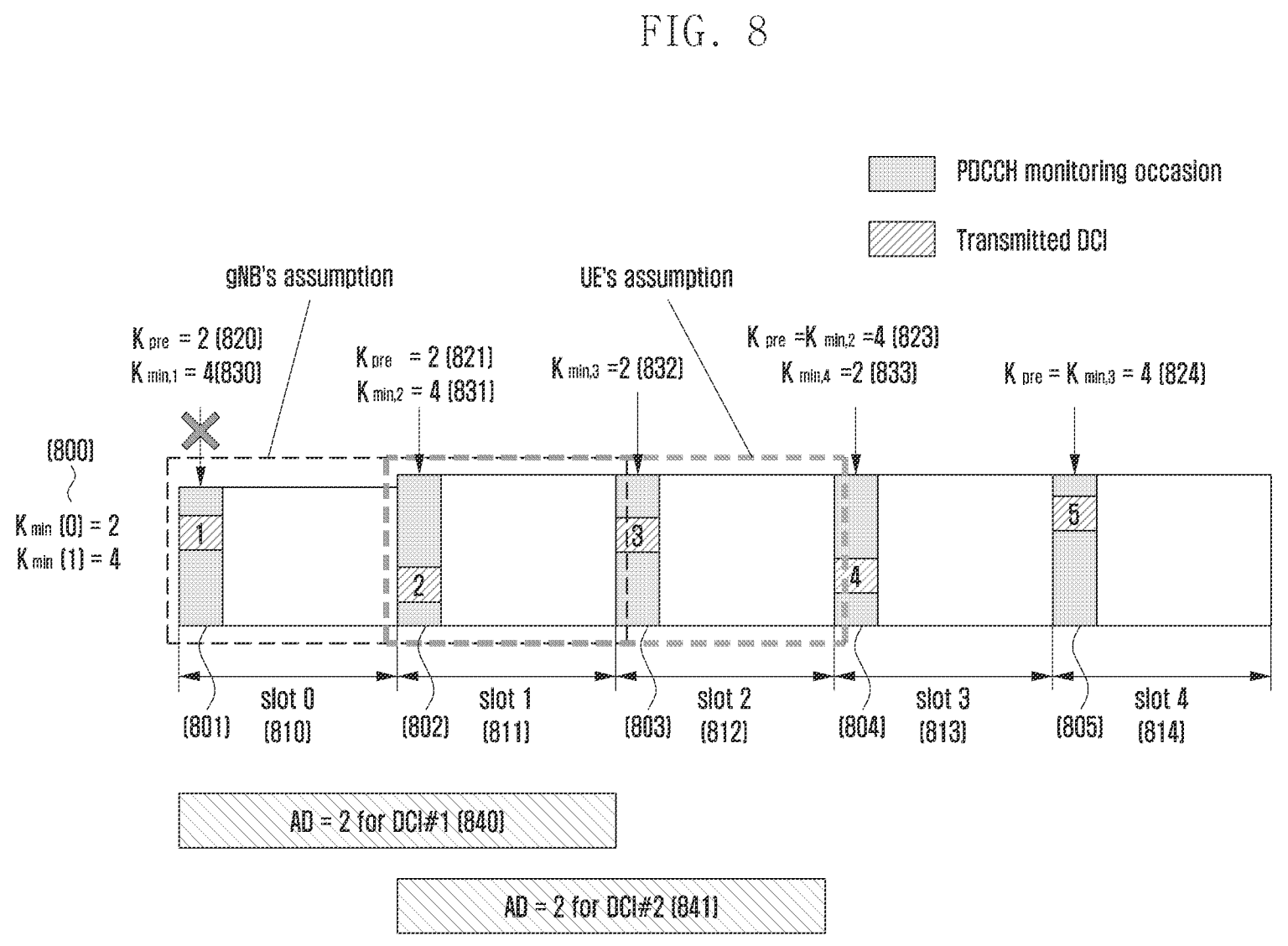

PDCCH monitoring occasion

Transmitted DCI gNB's assumption

UE's assumption (800)

$K_{min}(0) = 2$ $K_{min}(1) = 4$ $K_{pre} = 2$ (820)

$K_{min,1} = 4$(830)

$K_{pre} = 2$ (821)

$K_{min,2} = 4$ (831)

$K_{min,3} = 2$ (832)

$K_{pre} = K_{min,2} = 4$ (823)

$K_{min,4} = 2$ (833)

$K_{pre} = K_{min,3} = 4$ (824)

1

2

3

4

5

(801) slot 0 (810)

(802) slot 1 (811)

(803) slot 2 (812)

(804) slot 3 (813)

(805) slot 4 (814)

AD = 2 for DCI#1 (840)

AD = 2 for DCI#2 (841)

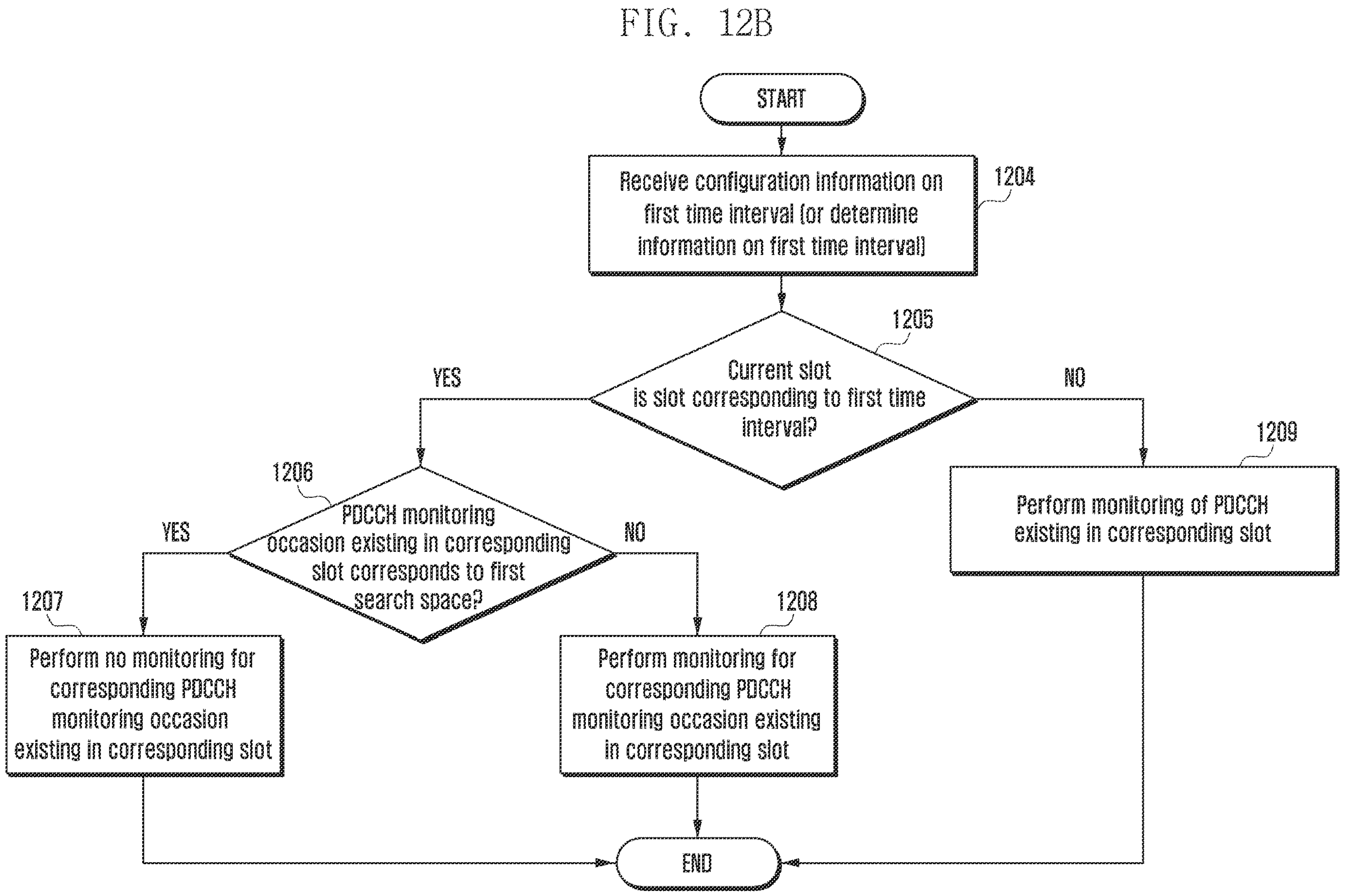
FIG. 12B
START
Receive configuration information on first time interval (or determine information on first time interval)
1204
1205
Current slot is slot corresponding to first time interval?
YES
NO
1206
PDCCH monitoring occasion existing in corresponding slot corresponds to first search space?
YES
NO
1209
Perform monitoring of PDCCH existing in corresponding slot
1207
Perform no monitoring for corresponding PDCCH monitoring occasion existing in corresponding slot
1208
Perform monitoring for corresponding PDCCH monitoring occasion existing in corresponding slot
END

CROSS SLOT SCHEDULING METHOD AND DEVICE IN WIRELESS COMMUNICATION SYSTEM

TECHNICAL FIELD

The disclosure relates to a method and a device for cross-slot scheduling in a wireless communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" communication system or a "Post LTE" system. The 5G communication system is considered to be implemented in ultrahigh frequency (mmWave) bands (e.g., 60 GHz bands) so as to accomplish higher data rates. To decrease propagation loss of the radio waves and increase the transmission distance in the ultrahigh frequency bands, beamforming, massive multiple-input multiple-output (MIMO), full dimensional MIMO (FD-MIMO), array antenna, analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

With the advance of wireless communication systems as described above, various services can be provided, and accordingly there is a need for schemes to effectively provide these services.

DISCLOSURE OF INVENTION

Technical Problem

Disclosed embodiments are to provide a device and a method capable of efficiently providing a service in a mobile communication system.

Solution to Problem

A method of a terminal in a communication system according to an embodiment of the disclosure for solving the above tasks may include receiving downlink control information (DCI) including a minimum offset indication field indicating a first minimum offset from a base station, identifying an application delay for application of the first minimum offset, and transmitting data to or receiving data from the base station, based on the first minimum offset after the application delay from a time point at which the DCI has been received, wherein, during the application delay from the time point at which the DCI has been received, DCI including a minimum offset indication field indicating a minimum offset other than the first minimum offset is not received from the base station.

According to an embodiment, the application delay may be identified based on a subcarrier spacing of a physical downlink control channel (PDCCH), a subcarrier spacing of a physical downlink shared channel (PDSCH), and a subcarrier spacing of an active bandwidth part (BWP).

According to an embodiment, the method may further include identifying a monitoring period of a search space set related to the first minimum offset, and receiving the DCI including the minimum offset indication field, based on the monitoring period of the search space set related to the first minimum offset.

According to an embodiment, the monitoring period of the search space set related to the first minimum offset may be greater than or equal to a specific value.

A method of a base station in a communication system, according to an embodiment of the disclosure may include transmitting, to a terminal, downlink control information (DCI) including a minimum offset indication field indicating a first minimum offset, identifying an application delay for application of the first minimum offset, and transmitting data to or receiving data from the terminal, based on the first minimum offset after the application delay from a time point at which the DCI has been transmitted, wherein, during the application delay from the time point at which the DCI has been transmitted, DCI including a minimum offset indication field indicating a minimum offset other than the first minimum offset is not transmitted to the terminal.

A terminal of a communication system, according to an embodiment of the disclosure may include a transceiver, and a controller configured to receive downlink control information (DCI) including a minimum offset indication field indicating a first minimum offset from a base station, identify an application delay for application of the first minimum offset, and transmit data to or receive data from the base station, based on the first minimum offset after the application delay from a time point at which the DCI has been received, wherein, during the application delay from the time point at which the DCI has been received, DCI including a minimum offset indication field indicating a minimum offset other than the first minimum offset is not received from the base station.

A base station of a communication system according to an embodiment of the disclosure may include a transceiver, and a controller configured to transmit, to a terminal, downlink control information (DCI) including a minimum offset indication field indicating a first minimum offset, identify an application delay for application of the first minimum offset, and transmit data to or receive data from the terminal, based on the first minimum offset after the application delay from a time point at which the DCI has been transmitted, wherein, during the application delay from the time point at which the DCI has been transmitted, DCI including a minimum offset indication field indicating a minimum offset other than the first minimum offset is not transmitted to the terminal.

Advantageous Effects of Invention

Disclosed embodiments provide a device and a method capable of efficiently providing a service in a mobile communication system.

BRIEF DESCRIPTION OF DRAWINGS

FIG. 8 is a diagram illustrating an example of a cross-slot scheduling method according to an embodiment of the disclosure;

FIG. 12B is a diagram illustrating an example of a terminal operation according to another embodiment of the disclosure;

MODE FOR THE INVENTION

Figure 1:
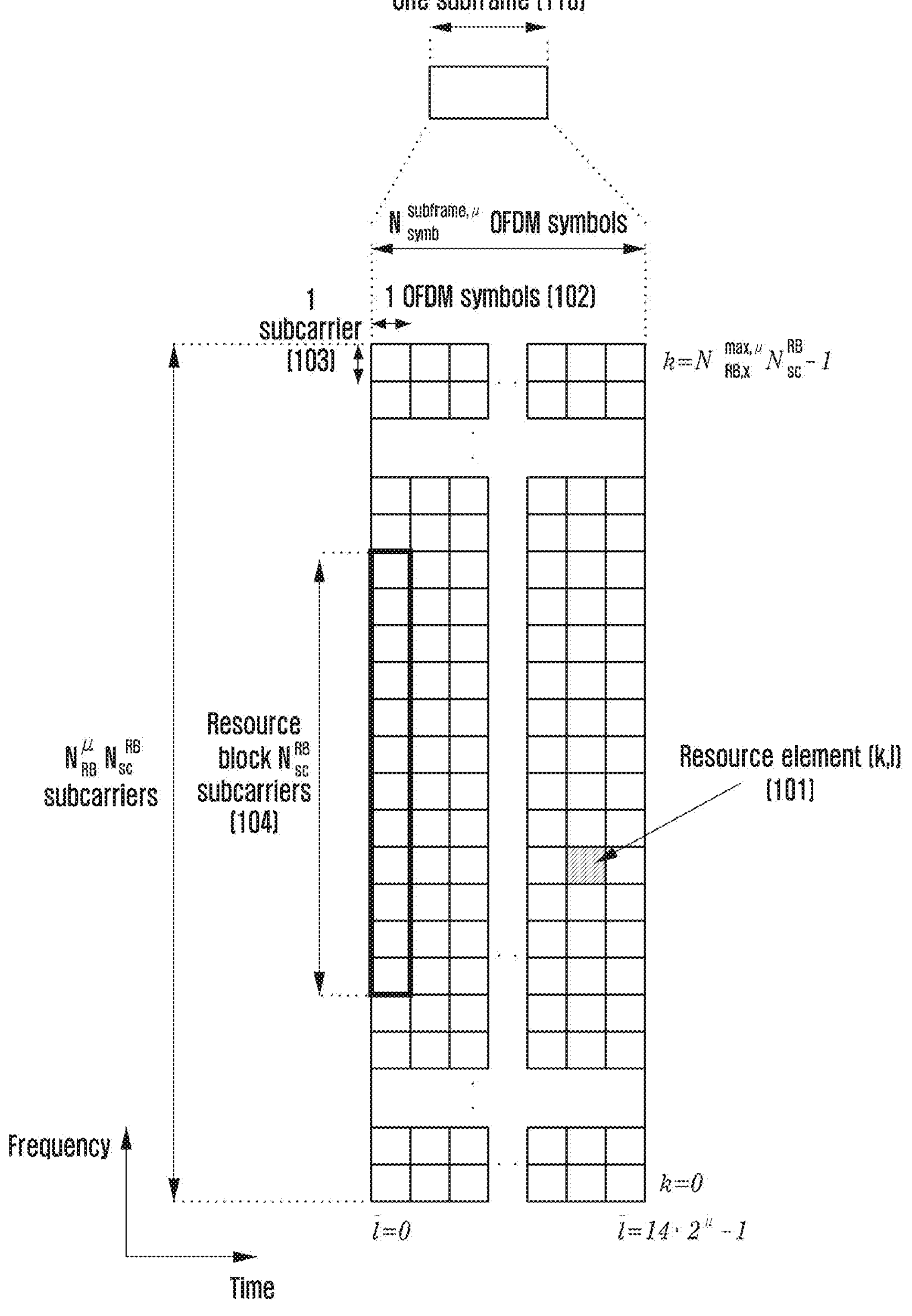
FIG. 1 is a diagram illustrating a basic structure of a time-frequency domain in 5G according to an embodiment of the disclosure.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. Further, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. In the disclosure, a “downlink (DL)” refers to a radio link via which a base station transmits a signal to a terminal, and an “uplink (UL)” refers to a radio link via which a terminal transmits a signal to a base station. Further, in the following description, LTE or LTE-A systems may be described by way of example, but the embodiments of the disclosure may also be applied to other communication systems having similar technical backgrounds or channel types. Examples of such communication systems may include 5th generation mobile communication technologies (5G, new radio, and NR) developed beyond LTE-A, and in the following description, the “5G” may be the concept that covers the exiting LTE, LTE-A, or other similar services. In addition, based on determinations by those skilled in the art, the embodiments of the disclosure may also be applied to other communication systems through some modifications without significantly departing from the scope of the disclosure.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

A wireless communication system has been developed from a wireless communication system providing a voice centered service in the early stage toward broadband wireless communication systems providing high-speed, high-quality packet data services, such as communication standards, for example, 3GPP's high speed packet access (HSPA), long-term evolution (LTE) or evolved universal terrestrial radio access (E-UTRA), LTE-advanced (LTE-A), LTE-Pro, 3GPP2's high-rate packet data (HRPD), ultra-mobile broadband (UMB), IEEE's 802.16e, and the like.

In an LTE system, which is a representative example of the broadband wireless communication system, a downlink (DL) adopts an orthogonal frequency division multiplexing (OFDM) scheme and an uplink (UL) adopts a single carrier frequency division multiple access (SC-FDMA) scheme. The uplink refers to a radio link via which a terminal (user equipment (UE) or mobile station (MS)) transmits data or a control signal to a base station (BS) (or eNode B), and the downlink refers to a radio link via which a base station transmits data or a control signal to a terminal. In such a multi-access scheme, normally data or control information of each user may be distinguished by assigning and operating time-frequency resources, at which the data or control information of each user is to be transmitted, so as not to overlap each other, that is, to establish orthogonality.

A 5G communication system, that is, a future communication system after LTE, should be able to freely reflect various requirements of users, service providers, etc., so that a service that concurrently satisfies various requirements should be supported. Services considered for the 5G communication system include an enhanced mobile broadband (eMBB) communication, massive machine type communication (mMTC), ultra-reliability low latency communication (URLLC), and the like.

The eMBB aims to provide a data transmission rate that is more improved than a data transmission rate supported by existing LTE, LTE-A or LTE-Pro. For example, in the 5G communication system, an eMBB should be able to provide a maximum data rate (peak data rate) of 20 Gbps in a downlink and a peak data rate of 10 Gbps in an uplink from the perspective of one base station. The 5G communication system needs to provide a maximum data rate while concurrently providing an increased actual user perceived data rate of a terminal. In order to satisfy these requirements, improvement of various transmission or reception technologies including a more advanced multi-antenna (multi-input multi-output (MIMO)) transmission technology is required. In addition, in a 2 Ghz band used by LTE, a signal is transmitted using a maximum transmission bandwidth of 20 MHz, whereas, in the 5G communication system, a data transmission rate, which is required by the 5G communication system, may be satisfied by using a frequency bandwidth wider than 20 MHz in a frequency band of 3 to 6 GHz or a frequency band of 6 GHz or higher.

Meantime, mMTC is being considered to support application services, such as Internet of things (IoT), in the 5G communication system. In order to efficiently provide IoT, mMTC may require support of a large-scale terminal access in a cell, coverage enhancement of a terminal, an improved battery time, cost reduction of a terminal, and the like. IoT is attached to multiple types of sensors and various devices to provide communication functions, so that IoT should be able to support a large number of terminals (e.g., 1,000,000 terminals/km2) within a cell. Due to the nature of a service, a terminal that supports mMTC is likely to be located in a shaded region, which cannot be covered by a cell, such as the basement of a building, and therefore a wider coverage may be required compared to other services provided by the 5G communication system. The terminal that supports mMTC may be required to be a low-cost terminal, and since it is difficult to frequently replace a battery of the terminal, a very long battery life time, such as 10 to 15 years, may be required.

URLLC is a cellular-based wireless communication service used for a specific purpose (mission-critical). For example, services, etc. used for a remote control of a robot or machinery, industrial automation, an unmanned aerial vehicle, remote health care, an emergency alert, and the like may be considered. Therefore, communication provided by URLLC should also provide very low latency and very high reliability. For example, a service that supports URLLC should satisfy an air interface latency less than 0.5 milliseconds and has requirements of a packet error rate of $10^{-5}$ or less at the same time. Therefore, for the service that supports URLLC, the 5G system may be required to provide a smaller transmit time interval (TTI) compared to other services, and at the same time, design matters for allocating a wide resource in a frequency band may be required to secure the reliability of a communication link.

Three services of 5G, which are eMBB, URLLC, and mMTC, may be multiplexed and transmitted in a single system. Different transmission or reception techniques and transmission or reception parameters may be used between services in order to satisfy different requirements of respective services. 5G is not limited to the three services described above.

Hereinafter, a frame structure of a 5G system will be described in more detail with reference to the drawings.

FIG. 1 is a diagram illustrating a basic structure of a time-frequency domain that is a radio resource region in which data or a control channel is transmitted in a 5G system.

In FIG. 1, a horizontal axis represents a time domain, and a vertical axis represents a frequency domain. A basic unit of a resource in the time and frequency domains is a resource element (RE) 101, and may be defined to be 1 orthogonal frequency division multiplexing (OFDM) symbol 102 on the time axis and 1 subcarrier 103 on the frequency axis.

$$N_{SC}^{RB}$$

consecutive REs (for example, 12) in the frequency domain may constitute one resource block (RB) 104.

Figure 2:
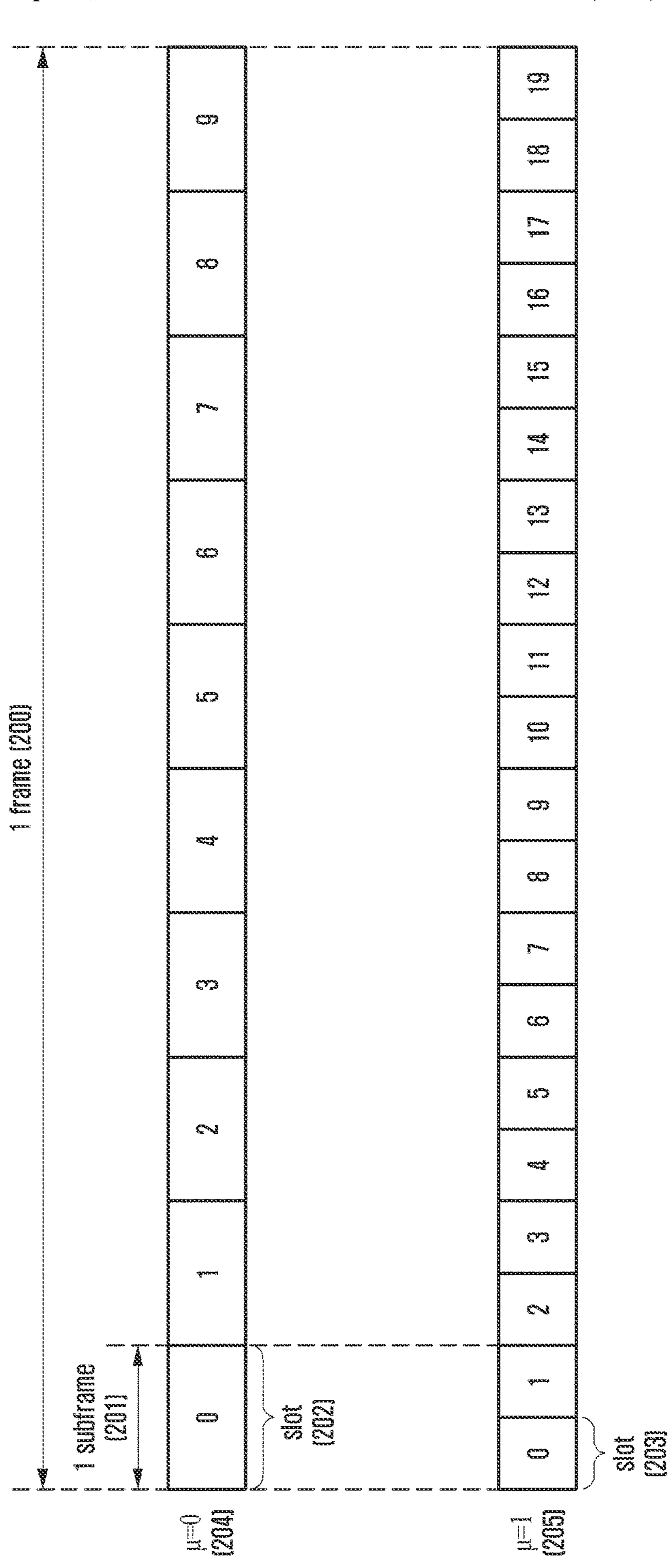
FIG. 2 is a diagram illustrating a structure of a frame, a subframe, and a slot in 5G according to an embodiment of the disclosure.

FIG. 2 is a diagram illustrating a slot structure considered in the 5G system.

FIG. 2 illustrates an example of a structure of a frame 200, a subframe 201, and a slot 202. One frame 200 may be defined to be 10 ms. One subframe 201 may be defined to be 1 ms, and thus one frame 200 may include a total of 10 subframes 201. One slot 202 or 203 may be defined to be 14 OFDM symbols (that is, the number of symbols per slot $$\left(N_{symb}^{slot}\right) = 14).$$

One subframe 201 may include one or multiple slots 202 and 203, and the number of slots 202 and 203 for one subframe 201 may vary according to configuration values p 204 and 205 for subcarrier spacings. In an example of FIG. 2, a case where μ=0 204, and a case where μ=1 205 are illustrated as subcarrier spacing configuration values. In the case where μ=0 204, one subframe 201 may include one slot 202, and in the case where μ=1 205, one subframe 201 may include two slots 203. That is, the number $$\left(N_{slot}^{subframe}\right)$$

of slots per subframe may vary according to configuration value μ for a subcarrier spacing, and accordingly, the number $$\left(N_{slot}^{frame}\right)$$

of slots per frame may vary.

$$N_{slot}^{subframe}$$

and $$N_{slot}^{frame}$$

according to respective subcarrier spacing configurations μ may be defined in Table 1 below.

TABLE 1

| μ | $N_{symb}^{slot}$ | $N_{slot}^{subframe}$ | $N_{slot}^{frame}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Subsequently, a bandwidth part (BWP) configuration in the 5G communication system will be described in detail with reference to the drawings.

Figure 3:
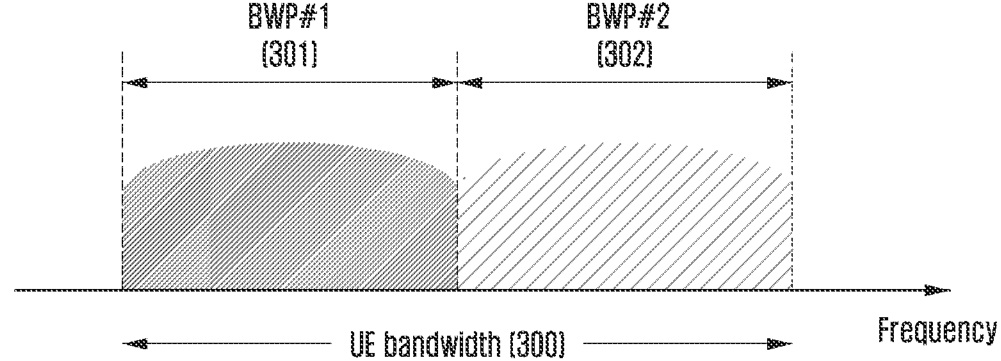
FIG. 3 is a diagram illustrating an example of a bandwidth part configuration in 5G according to an embodiment of the disclosure.

FIG. 3 is a diagram illustrating an example of a configuration for a bandwidth part in the 5G communication system.

FIG. 3 shows an example in which a terminal bandwidth (UE bandwidth) 300 is configured to have two bandwidth parts that are bandwidth part #1 301 and bandwidth part #2 302. A base station may configure one or multiple bandwidth parts for a terminal, and may configure the following information for each bandwidth part.

TABLE 2

```
BWP ::=                          SEQUENCE {
    bwp-Id                              BWP-Id,
  (Bandwidth part identifier)
    locationAndBandwidth                INTEGER (1..65536),
    (Bandwidth part location)
    subcarrierSpacing                   ENUMERATED {n0, n1, n2, n3, n4, n5},
    (Subcarrier spacing)
    cyclicPrefix                    ENUMERATED { extended }
    (Cyclic prefix)
```

The disclosure is not limited to the above example, and in addition to the configuration information, various parameters related to the bandwidth part may be configured for a terminal. The base station may transfer the information to the terminal via higher layer signaling, for example, radio resource control (RRC) signaling. At least one bandwidth part among the configured one or multiple bandwidth parts may be activated. Whether or not the configured bandwidth part is active may be transferred from the base station to the terminal in a semi-static manner via RRC signaling or may be dynamically transferred via downlink control information (DCI).

According to some embodiments, the base station may configure an initial bandwidth part (BWP) for initial access, via a master information block (MIB), for the terminal before an RRC connection. More specifically, in an initial access stage, the terminal may receive configuration information for a search space and a control area (control resource set (CORESET)) in which a PDCCH for receiving system information (may correspond to remaining system information (RMSI) or system information block 1 (SIB1)) required for initial access may be transmitted via the MIB. Each of the search space and the control resource set configured via the MIB may be considered to be identifier (identity (ID)) 0. The base station may notify the terminal of configuration information, such as frequency allocation information, time allocation information, and numerology for control resource set #0, via the MIB. In addition, the base station may notify, via the MIB, the terminal of configuration information for a monitoring period and occasion for control resource set #0, that is, the configuration information for search space #0. The terminal may consider a frequency domain configured to control resource set #0, which is obtained from the MIB, as an initial bandwidth part for initial access. In this case, an identity (ID) of the initial bandwidth part may be considered to be 0.

The configuration of a bandwidth part supported by 5G may be used for various purposes.

According to some embodiments, if a bandwidth supported by the terminal is smaller than a bandwidth supported by a system bandwidth, this may be supported via the bandwidth part configuration. For example, the base station may configure, for the terminal, a frequency position (configuration information 2) of the bandwidth part, and the terminal may thus transmit or receive data at a specific frequency position within the system bandwidth.

According to some embodiments, for the purpose of supporting different numerologies, the base station may configure multiple bandwidth parts for the terminal. For example, in order to support both data transmission and reception using a subcarrier spacing of 15 kHz and a subcarrier spacing of 30 kHz for a terminal, two bandwidth parts may be configured with the subcarrier spacings of 15 kHz and 30 kHz, respectively. Different bandwidth parts may be frequency-division-multiplexed, and when data is to be transmitted or received at a specific subcarrier spacing, a bandwidth part configured with the subcarrier spacing may be activated.

According to some embodiments, for the purpose of reducing power consumption of the terminal, the base station may configure, for the terminal, bandwidth parts having different bandwidth sizes. For example, if the terminal supports a very large bandwidth, for example, 100 MHz, and always transmits or receives data via the corresponding bandwidth, very large power consumption may occur. In particular, in a situation where there is no traffic, it may be very inefficient, in terms of power consumption, to perform monitoring for an unnecessary downlink control channel with a large bandwidth of 100 Mhz. For the purpose of reducing the power consumption of the terminal, the base station may configure, for the terminal, a bandwidth part of a relatively small bandwidth, for example, a bandwidth part of 20 Mhz. In the situation where there is no traffic, the terminal may perform monitoring in the bandwidth part of 20 MHz, and when data is generated, the terminal may transmit or receive the data by using the bandwidth part of 100 MHz according to an indication of the base station.

In the method for configuring the bandwidth part, terminals before an RRC connection may receive configuration information for an initial bandwidth part via a master information block (MIB) in an initial access stage. More specifically, a terminal may be configured for a control resource set (CORESET) for a downlink control channel through which downlink control information (DCI) for scheduling of a system information block (SIB) may be transmitted from an MIB of a physical broadcast channel (PBCH). The bandwidth of the control resource set, which is configured via the MIB may be considered to be the initial bandwidth part, and the terminal may receive a physical downlink shared channel (PDSCH), through which the SIB is transmitted, via the configured initial bandwidth part. In addition to reception of the SIB, the initial bandwidth part may be used for other system information (OSI), paging, and random access.

When one or more bandwidth parts are configured for the terminal, the base station may indicate the terminal to switch a bandwidth part, by using a bandwidth part indicator field in DCI. For example, in FIG. 3, if a currently active bandwidth part of the terminal is bandwidth part #1 301, the base station may indicate bandwidth part #2 302 to the terminal via the bandwidth part indicator in the DCI, and the terminal may switch the bandwidth part to bandwidth part #2 302 indicated via the bandwidth part indicator in the received DCI.

As described above, the DCI-based switching of the bandwidth part may be indicated by the DCI for scheduling of the PDSCH or PUSCH, and thus when a request for switching a bandwidth part is received, the terminal may need to receive or transmit the PDSCH or PUSCH scheduled by the corresponding DCI, with ease in the switched bandwidth part. To this end, in the standard, requirements for a delay time (TBWP) required when a bandwidth part is switched are regulated, and may be defined below, for example.

TABLE 2-1

| μ | NR Slot length (ms) | BWP switch delay $T_{BWP}$ (slots) Type 1[Note 1] | Type 2[Note 1] |
|---|---|---|---|
| 0 | 1 | [1] | [3] |
| 1 | 0.5 | [2] | [5] |
| 2 | 0.25 | [3] | [9] |
| 3 | 0.125 | [6] | [17] |

Note 1
Depends on UE capability.
Note 2:
If the BWP switch involves changing of SCS, the BWP switch delay is determined by the larger one between the SCS before BWP switch and the SCS after BWP switch.

The requirements for a bandwidth part switch delay time support type 1 or type 2 according to capability of the terminal. The terminal may report a supportable bandwidth part delay time type to the base station.

According to the aforementioned requirements for the bandwidth part switch delay time, when the terminal receives DCI including the bandwidth part switch indicator in slot n, the terminal may complete switching to a new bandwidth part indicated by the bandwidth part switch indicator at a time point no later than slot n+$T_{BWP}$, and may perform transmission or reception for a data channel scheduled by the corresponding DCI in the switched new bandwidth part. When the base station is to schedule a data channel in a new bandwidth part, time domain resource allocation for the data channel may be determined by considering the bandwidth part switch delay time (TBWP) of the terminal. That is, in a method for determining time domain resource allocation for a data channel when the base station schedules the data channel in a new bandwidth part, scheduling for the corresponding data channel may be performed after a bandwidth part switch delay time. Accordingly, the terminal may not expect that DCI indicating bandwidth part switching indicates a value of a slot offset (K0 or K2) smaller than a value of the bandwidth part switch delay time (TBWP).

If the terminal receives DCI (for example, DCI format 1_1 or 0_1) indicating bandwidth part switching, the terminal may not perform any transmission or reception during a time interval from a third symbol of a slot in which a PDCCH including the corresponding DCI is received to a start point of a slot indicated by a slot offset (K0 or K2) value indicated via a time domain resource allocation indicator field in the corresponding DCI. For example, when the terminal receives DCI indicating bandwidth part switching in slot n, and a slot offset value indicated by the corresponding DCI is K, the terminal may not perform any transmission or reception from a third symbol of slot n to a symbol before slot n+K (i.e., the last symbol in slot n+K−1).

In the following, a synchronization signal (SS)/PBCH block (SSB) in 5G will be described.

The SS/PBCH block may refer to a physical layer channel block including a primary SS (PSS), a secondary SS (SSS), and a PBCH. Detailed descriptions are as follows.

- PSS: A PSS is a signal that serves as a reference for downlink time/frequency synchronization, and provides some information of a cell ID.
- SSS: An SSS serves as a reference for downlink time/frequency synchronization, and provides remaining cell ID information that is not provided by a PSS. Additionally, the SSS may serve as a reference signal for demodulation of a PBCH.
- PBCH: A PBCH provides essential system information necessary for transmission or reception of a data channel and a control channel of a terminal. The essential system information may include search space-related control information indicating radio resource mapping information of a control channel, scheduling control information on a separate data channel for transmitting system information, and the like.
- SS/PBCH block: An SS/PBCH block includes a combination of a PSS, an SSS, and a PBCH. One or multiple SS/PBCH blocks may be transmitted within 5 ms, and each transmitted SS/PBCH block may be distinguished by an index.

The terminal may detect the PSS and the SSS in an initial access stage and may decode the PBCH. The MIB may be obtained from the PBCH, and control resource set (CORESET)#0 (which may correspond to a control resource set having a control resource set index of 0) may be configured therefrom. The terminal may perform monitoring on control resource set #0 while assuming that a selected SS/PBCH block and a demodulation reference signal (DMRS) transmitted in control resource set #0 are quasi co-located (QCL). The terminal may receive system information as downlink control information transmitted in control resource set #0. The terminal may acquire random access channel (RACH)-related configuration information required for initial access from the received system information. The terminal may transmit a physical RACH (PRACH) to the base station in consideration of a selected SS/PBCH index, and the base station having received the PRACH may acquire information on the SS/PBCH block index selected by the terminal. The base station may identify a block that the terminal has selected from among respective SS/PBCH blocks and may identify that control resource set #0 associated with the selected block is monitored.

Next, downlink control information (DCI) in the 5G system will be described in detail.

In the 5G system, scheduling information for uplink data (or physical uplink data channel (physical uplink shared channel, PUSCH)) or downlink data (or physical downlink data channel (physical downlink shared channel, PDSCH)) is transferred from the base station to the terminal via DCI. The terminal may monitor a fallback DCI format and a non-fallback DCI format for the PUSCH or the PDSCH. The fallback DCI format may include a fixed field predefined between the base station and the terminal, and the non-fallback DCI format may include a configurable field.

The DCI may be transmitted on a physical downlink control channel (PDCCH) via channel coding and modulation. A cyclic redundancy check (CRC) is attached to a DCI message payload, and may be scrambled with a radio network temporary identifier (RNTI) corresponding to an identity of the terminal. Different RNTIs may be used according to a purpose of the DCI message, for example, UE-specific (UE-specific) data transmission, a power control command, a random access response, or the like. In other words, the RNTI is not transmitted explicitly, but is included in CRC calculation and transmitted. When a DCI message transmitted on the PDCCH is received, the terminal may check a CRC by using an allocated RNTI, and may determine, if a CRC check result is correct, that the message is transmitted to the terminal.

For example, DCI for scheduling of a PDSCH for system information (SI) may be scrambled with an SI-RNTI. DCI for scheduling of a PDSCH for a random access response (RAR) message may be scrambled with an RA-RNTI. DCI for scheduling of a PDSCH for a paging message may be scrambled with a P-RNTI. DCI for notification of a slot format indicator (SFI) may be scrambled with an SFI-RNTI. DCI for notification of a transmit power control (TPC) may be scrambled with a TPC-RNTI. DCI for scheduling of UE-specific PDSCH or PUSCH may be scrambled with a cell RNTI (C-RNTI).

DCI format 0_0 may be used as fallback DCI for scheduling of the PUSCH, wherein the CRC is scrambled with the C-RNTI. DCI format 0_0 in which the CRC is scrambled with the C-RNTI may include, for example, the following information.

TABLE 3

| |
|---|
| Identifier for DCI formats (DCI format identifier) - [1] bit |
| Frequency domain resource assignment (Frequency domain resource assignment) - $[\lceil \log_2(N_{RB}^{UL,BWP}(N_{RB}^{UL,BWP}+1)/2 \rceil]$ bits |

TABLE 3-continued

| |
|---|
| Time domain resource assignment (Time domain resource assignment) - X bits |
| Frequency hopping flag (Frequency hopping flag) - 1 bit. |
| Modulation and coding scheme (Modulation and coding scheme) - 5 bits |
| New data indicator (New data indicator) - 1 bit |
| Redundancy version (Redundancy version) - 2 bits |
| HARQ process number (HARQ process number) - 4 bits |
| TPC command for scheduled PUSCH (Transmit power control (TPC) command for scheduled PUSCH) - [2] bits |

TABLE 3-continued

| |
|---|
| UL/SUL indicator (Uplink/supplementary UL (UL/SUL) identifier) - 0 or 1 bit |

DCI format 0_1 may be used as non-fallback DCI for scheduling of PUSCH, wherein the CRC is scrambled with the C-RNTI. DCI format 0_1 in which the CRC is scrambled with the C-RNTI may include, for example, the following information.

TABLE 4

- Carrier indicator (Carrier indicator) - 0 or 3 bits
- UL/SUL indicator - 0 or 1 bit
- Identifier for DCI formats - [1] bits
- Bandwidth part indicator (Bandwidth part indicator) - 0, 1 or 2 bits
- Frequency domain resource assignment
  - For resource allocation type 0(For resource allocation type 0), $\lceil N_{RB}^{UL,BWP}/P \rceil$ bits
  - For resource allocation type 1(For resource allocation type 1), $\lceil \log_2(N_{RB}^{UL,BWP}(N_{RB}^{UL,BWP}+1)/2) \rceil$ bits
- Time domain resource assignment -1, 2, 3, or 4 bits
- VRB-to-PRB mapping (Virtual resource block-to-physical resource block mapping) - 0 or 1 bit, only for resource allocation type 1.
  - 0 bit if only resource allocation type 0 is configured;
  - 1 bit otherwise.
- Frequency hopping flag - 0 or 1 bit, only for resource allocation type 1.
  - 0 bit if only resource allocation type 0 is configured;
  - 1 bit otherwise.
- Modulation and coding scheme - 5 bits
- New data indicator - 1 bit
- Redundancy version - 2 bits
- HARQ process number - 4 bits
- 1st downlink assignment index (First downlink assignment index)- 1 or 2 bits
  - 1 bit for semi-static HARQ-ACK codebook(For semi-static HARQ-ACK codebook);
  - 2 bits for dynamic HARQ-ACK codebook with single HARQ-ACK codebook(When dynamic HARQ-ACK codebook is used with a single HARQ-ACK codebook).
- 2nd downlink assignment index (Second downlink assignment index) - 0 or 2 bits
  - 2 bits for dynamic HARQ-ACK codebook with two HARQ-ACK sub-codebooks(When dynamic HARQ-ACK codebook is used with two HARQ-ACK codebooks);
  - 0 bit otherwise.
- TPC command for scheduled PUSCH - 2 bits
- SRS resource indicator (SRS resource indicator - $\left\lceil log_2\left(\sum_{k=1}^{L_{max}} \binom{N_{SRS}}{k}\right)\right\rceil$ or $\lceil \log_2(N_{SRS}) \rceil$ bits
  - $\left\lceil log_2\left(\sum_{k=1}^{L_{max}} \binom{N_{SRS}}{k}\right)\right\rceil$ bits for non−codebook based PUSCH transmission(When PUSCH transmission is not based on codebook);
  - $\lceil \log_2(N_{SRS}) \rceil$ bits for codebook based PUSCH transmission(When PUSCH transmission is based on codebook).
- Precoding information and number of layers (Precoding information and number of layers)-up to 6 bits
- Antenna ports (Antenna port)- up to 5 bits
- SRS request (Sounding reference signal request)- 2 bits
- CSI request (Channel state information request) - 0, 1,2, 3, 4, 5, or 6 bits
- CBG transmission information (Code block group transmission information)- 0, 2, 4, 6, or 8 bits
- PTRS-DMRS association (Phase tracking reference signal (PTRS)-demodulation reference signal (DMRS) relationship)- 0 or 2 bits.
- beta_offset indicator (beta offset indicator)- 0 or 2 bits
- DMRS sequence initialization (Demodulation reference signal sequence (DMRS) initialization)- 0 or 1 bit DCI format 1_0 may be used as fallback DCI for scheduling of the PDSCH, wherein the CRC is scrambled with the C-RNTI. DCI format 0_1 in which the CRC is scrambled with the C-RNTI may include, for example, the following information.

TABLE 5

---

Identifier for DCI formats - [1] bit
Frequency domain resource assignment -

$\left[\left\lceil \log_2\left(N_{RB}^{DL,BWP}\left(N_{RB}^{DL,BWP}+1\right)/2\right)\right\rceil\right]$ bits Time domain resource assignment - X bits
VRB-to-PRB mapping - 1 bit.
Modulation and coding scheme - 5 bits
New data indicator - 1 bit
Redundancy version - 2 bits
HARQ process number - 4 bits
Downlink assignment index - 2 bits
TPC command for scheduled PUCCH - [2] bits
PUCCH resource indicator (Physical uplink control channel (PUCCH)resource indicator) - 3 bits
PDSCH-to-HARQ feedback timing indicator (PDSCH-to-HARQ feedback timing indicator) - [3] bits

---

DCI format 1_1 may be used as non-fallback DCI for scheduling of the PUSCH, wherein the CRC is scrambled with the C-RNTI. DCI format 1_1 in which the CRC is scrambled with the C-RNTI may include, for example, the following information.

TABLE 6

---

Carrier indicator - 0 or 3 bits
Identifier for DCI formats - [1] bits
Bandwidth part indicator - 0, 1 or 2 bits
Frequency domain resource assignment For resource allocation type 0, $\left\lceil N_{RB}^{DL,BWP}/P\right\rceil$ bits For resource allocation type 1, $\left\lceil \log_2\left(N_{RB}^{DL,BWP}\left(N^{DL,DWP}+1\right)/2\right\rceil$ bits Time domain resource assignment - 1, 2, 3, or 4 bits
VRB-to-PRB mapping - 0 or 1 bit, only for resource allocation type 1.
0 bit if only resource allocation type 0 is configured;
1 bit otherwise.
PRB bundling size indicator (Physical resource block bundling size indicator) - 0 or 1 bit TABLE 6-continued

---

Rate matching indicator (Rate matching indicator) - 0, 1, or 2 bits
ZP CSI-RS trigger (Zero power (ZP) channel state information reference signal (CSI-RS) trigger) - 0, 1, or 2 bits
For transport block 1(For first transmission block):
Modulation and coding scheme - 5 bits
New data indicator - 1 bit
Redundancy version - 2 bits
For transport block 2(For second transmission block):
Modulation and coding scheme - 5 bits
New data indicator - 1 bit
Redundancy version - 2 bits
HARQ process number - 4 bits
Downlink assignment index - 0 or 2 or 4 bits
TPC command for scheduled PUCCH - 2 bits
PUCCH resource indicator - 3 bits
PDSCH-to-HARQ_feedback timing indicator - 3 bits
Antenna ports - 4, 5 or 6 bits
Transmission configuration indication (Transmission configuration indication) - 0 or 3 bits
SRS request - 2 bits
CBG transmission information - 0, 2, 4, 6, or 8 bits
CBG flushing out information (Code block group (CBG) flushing out information) - 0 or 1 bit
DMRS sequence initialization - 1 bit

---

Hereinafter, a time domain resource allocation method for a data channel in the 5G communication system will be described.

The base station may configure, for the terminal via higher layer signaling (e.g., RRC signaling), a table for time domain resource allocation information on a downlink data channel (physical downlink shared channel (PDSCH)) and an uplink data channel (physical uplink shared channel (PUSCH)). A table including up to 16 entries (maxNrofDL-Allocations=16) may be configured for the PDSCH, and a table including up to 16 entries (maxNrofLTL-Allocations=16) may be configured for the PUSCH. The time domain resource allocation information may include, for example, a PDCCH-to-PDSCH slot timing (denoted as K0, and corresponding to a time interval in units of slots between a time point at which a PDCCH is received and a time point at which a PDSCH scheduled by the received PDCCH is transmitted), a PDCCH-to-PUSCH slot timing (denoted as K2, and corresponding to a time interval in units of slots between a time point at which a PDCCH is received and a time point at which a PUSCH scheduled by the received PDCCH is transmitted), information on a location and length of a start symbol in which the PDSCH or PUSCH is scheduled within a slot, a mapping type of the PDSCH or PUSCH, or the like. For example, information as in the tables below may be notified from the base station to the terminal.

TABLE 7

| PDSCH-TimeDomainResourceAllocationList information element |
| --- |

```
PDSCH-TimeDomainResourceAllocationList ::= SEQUENCE (SIZE(1..maxNrof DL-
Allocations) ) OF PDSCH-TimeDomainResourceAllocation
PDSCH-TimeDomainResourceAllocation ::= SEQUENCE {
    k0                                  INTEGER(0..32)
OPTIONAL,     -- Need S
        (PDCCH-to-PDSCH timing, slot unit)
mappingType                     ENUMERATED {typeA, typeB},
        (PDSCH mapping type)
startSymbolAndLength            INTEGER (0..127)
    (PDSCH start symbol and length)
}
```

TABLE 8

PUSCH-TimeDomainResourceAllocation information element

```
PUSCH-TimeDomainResourceAllocationList ::=          SEQUENCE
  (SIZE(1..maxNrofUL-Allocations)) OF PUSCH-TimeDomainResourceAllocation
PUSCH-TimeDomainResourceAllocation ::= SEQUENCE {
  k2                                              INTEGER(0..32)
OPTIONAL,      -- Need S
    (PDCCH-to-PUSCH timing, slot unit)
  mappingType                                     ENUMERATED {typeA, typeB},
    (PUSCH mapping type)
  startSymbolAndLength                            INTEGER (0..127)
    (PUSCH start symbol and length)
}
```

The base station may notify one of the entries in the tables relating to the time domain resource allocation information to the terminal via L1 signaling (e.g., DCI) (e.g., the entry may be indicated by a "time domain resource allocation" field in the DCI). The terminal may acquire the time domain resource allocation information for the PDSCH or PUSCH, based on the DCI received from the base station.

Hereinafter, a downlink control channel in the 5G communication system will be described in more detail with reference to the drawings.

Figure 4:
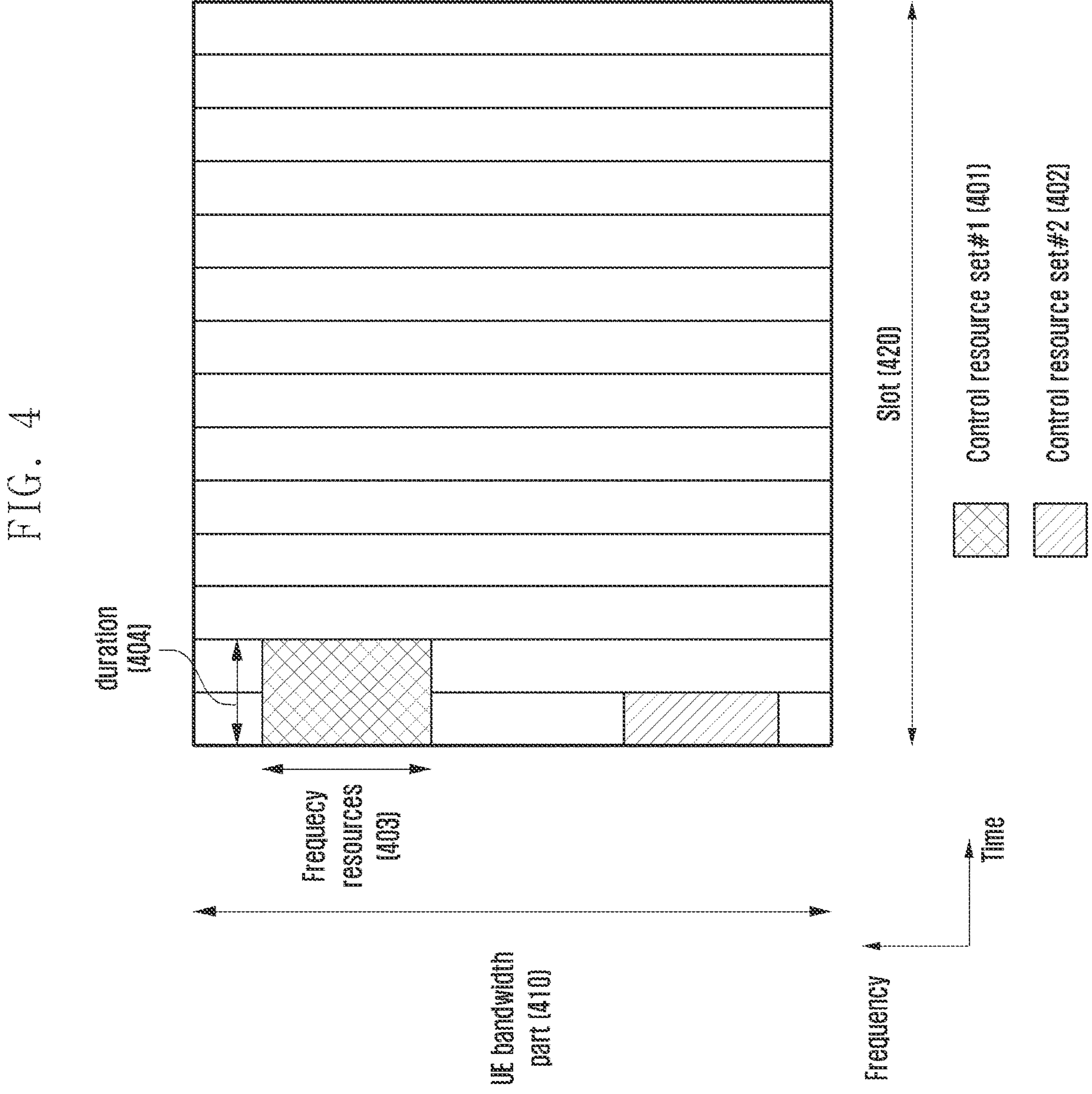
FIG. 4 is a diagram illustrating an example of a control resource set configuration of a downlink control channel in 5G according to an embodiment of the disclosure.

FIG. 4 is a diagram illustrating an example of a control resource set (CORESET) at which a downlink control channel is transmitted in the 5G wireless communication system. FIG. 4 illustrates an example in which a terminal bandwidth part 410 (UE bandwidth part) is configured on the frequency axis, and two control resource sets (control resource set #1 401 and control resource set #2 402) are configured within one slot 420 on the time axis. The control resource sets 401 and 402 may be configured in a specific frequency resource 403 within the entire terminal bandwidth part 410 on the frequency axis. One or multiple OFDM symbols may be configured on the time axis and may be defined as a control resource set duration 404. Referring to the example illustrated in FIG. 4, control resource set #1 401 is configured to a control resource set duration of 2 symbols, and control resource set #2 402 is configured to a control resource set duration of 1 symbol.

The aforementioned control resource set in 5G may be configured for the terminal by the base station via higher layer signaling (e.g., system information, master information block (MIB), and radio resource control (RRC) signaling). Configuring the control resource set for the terminal may refer to providing information, such as an identifier (identity) of the control resource set, a frequency location of the control resource set, and a symbol length of the control resource set. For example, the following information may be included.

TABLE 9

```
ControlResourceSet ::=                        SEQUENCE {
  -- Corresponds to L1 parameter 'CORESET-ID'
  controlResourceSetId                        ControlResourceSetId,
  (Control resource set identifier)
  frequencyDomainResources                    BIT STRING (SIZE (45)),
  (Frequency axis resource assignment information)
  duration                                    INTEGER
(1..maxCoReSetDuration),
  (Time axis resource assignment information)
  cce-REG-MappingType                         CHOICE
  (CCE-to-REG mapping type)                   SEQUENCE {
    interleaved
          reg-BundleSize                        ENUMERATED {n2, n3,
n6},
      (REG bundle size)
          precoderGranularity                   ENUMERATED
{sameAsREG-bundle, allContiguousRBs},
          interleaverSize                       ENUMERATED {n2, n3,
n6}
          (Interleaver size)
          shiftIndex
  INTEGER(0..maxNrofPhysicalResourceBlocks-1)
          OPTIONAL
        (Interleaver Shift)
    },
  nonInterleaved                              NULL
  },
  tci-StatesPDCCH                             SEQUENCE(SIZE
(1..maxNrofTCI-StatesPDCCH)) OF TCI-StateId
  OPTIONAL,
  (QCL configuration information)
  tci-PresentInDCI                            ENUMERATED {enabled}
                                              OPTIONAL,     -- Need S
}
```

In Table 9, tci-StatesPDCCH (simply, referred to as a transmission configuration indication (TCI) state) configuration information may include information on one or multiple synchronization signal (SS)/physical broadcast channel (PBCH) block indices or channel state information reference signal (CSI-RS) indices having the quasi co-location (QCL) relationship with a DMRS transmitted in the corresponding control resource set.

Figure 5:
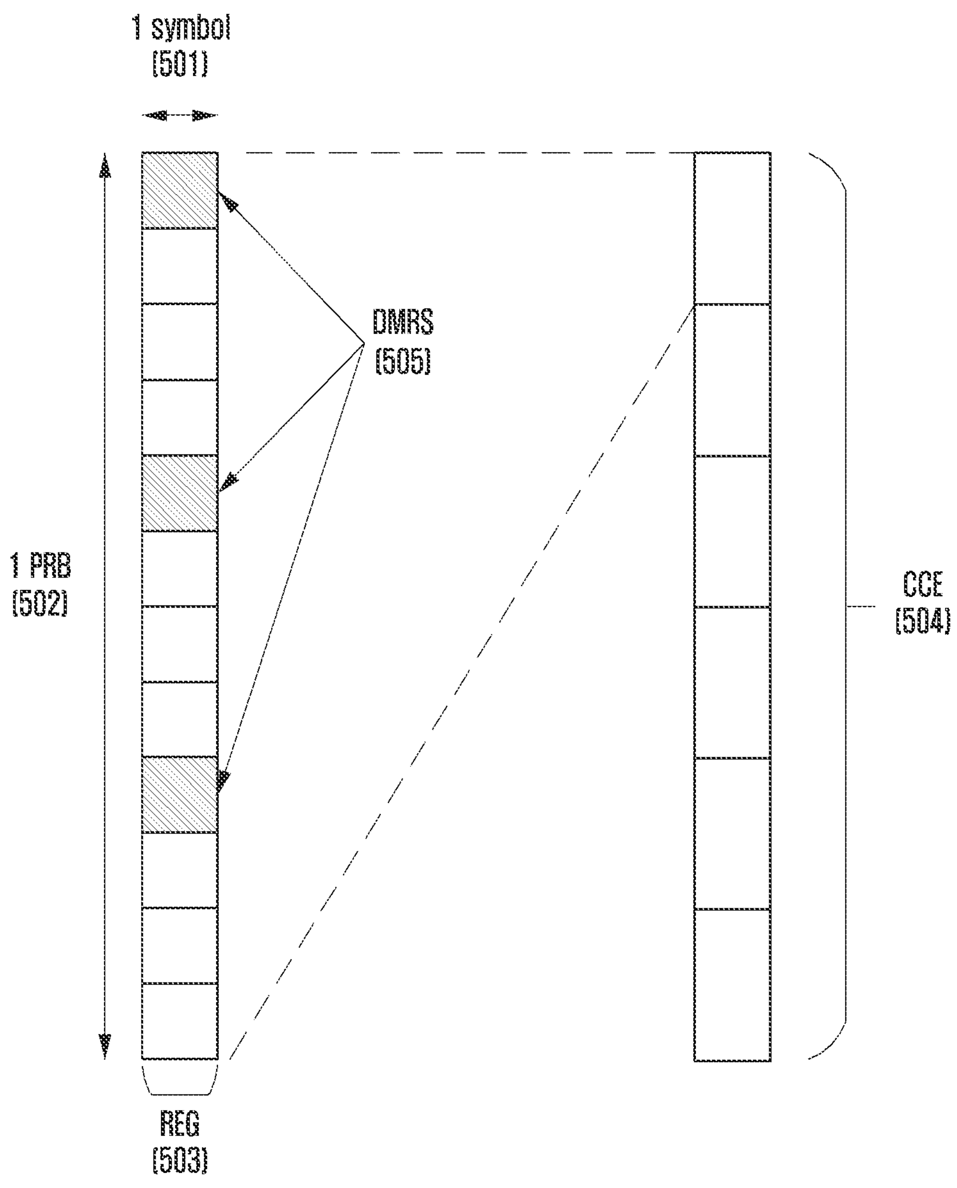
FIG. 5 is a diagram illustrating a structure of a downlink control channel in 5G according to an embodiment of the disclosure.

FIG. 5 is a diagram showing an example of a basic unit of time and frequency resources constituting a downlink control channel which may be used in 5G. According to FIG. 5, a basic unit of time and frequency resources constituting a control channel is referred to as a resource element group (REG) 503, and an REG 503 may be defined to have 1 OFDM symbol 501 on the time axis and 1 physical resource block (PRB) 502, that is, 12 subcarriers, on the frequency axis. A base station may configure a downlink control channel allocation unit by concatenation with the REG 503.

As illustrated in FIG. 5, when a basic unit for allocation of a downlink control channel in 5G is a control channel element (CCE) 504, 1 CCE 504 may include multiple REGs 503. When the REG 503 illustrated in FIG. 5 is described as an example, the REG 503 may include 12 REs, and if 1 CCE 504 includes 6 REGs 503, 1 CCE 504 may include 72 Res. When a downlink control resource set is configured, the corresponding resource set may include multiple CCEs 504, and a specific downlink control channel may be mapped to one or multiple CCEs 504 so as to be transmitted according to an aggregation level (AL) within the control resource set. The CCEs 504 within the control resource set are classified by numbers, and the numbers of the CCEs 504 may be assigned according to a logical mapping scheme.

The basic unit of the downlink control channel illustrated in FIG. 5, that is, the REG 503, may include both REs, to which DCI is mapped, and an area to which a DMRS 505, which is a reference signal for decoding the REs, is mapped. As shown in FIG. 5, 3 DMRSs 505 may be transmitted in 1 REG 503. The number of CCEs required to transmit the PDCCH may be 1, 2, 4, 8, or 16 depending on the aggregation level (AL), and different numbers of CCEs may be used to implement link adaptation of the downlink control channel. For example, if AL=L, a single downlink control channel may be transmitted via the L number of CCEs. The terminal needs to detect a signal without knowing information on the downlink control channel, wherein a search space representing a set of CCEs is defined for blind decoding. The search space is a set of downlink control channel candidates including CCEs, for which the terminal needs to attempt decoding on a given aggregation level, and since there are various aggregation levels that make one bundle with 1, 2, 4, 8, or 16 CCEs, the terminal may have multiple search spaces. A search space set may be defined as a set of search spaces at all configured aggregation levels.

The search space may be classified into a common search space and a terminal-specific (UE-specific) search space. A certain group of terminals or all terminals may examine a common search space of the PDCCH in order to receive cell-common control information, such as a dynamic scheduling or paging message for system information. For example, PDSCH scheduling allocation information for transmission of an SIB including cell operator information, etc. may be received by examining the common search space of the PDCCH. In the case of the common search space, the certain group of terminals or all terminals need to receive the PDCCH, and may thus be defined as a set of predetermined CCEs. Scheduling allocation information for UE-specific PDSCH or PUSCH may be received by examining the UE-specific search space of the PDCCH. The UE-specific search space may be defined UE-specifically on the basis of an identity of the terminal and functions of various system parameters.

In 5G, a parameter for the search space of the PDCCH may be configured from the base station to the terminal via higher layer signaling (e.g., SIB, MIB, and RRC signaling). For example, the base station may configure, for the terminal, the number of PDCCH candidates at each aggregation level L, a monitoring period for a search space, a monitoring occasion in units of symbols in the slot for the search space, a search space type (common search space or UE-specific search space), a combination of an RNTI and a DCI format, which is to be monitored in the search space, a control resource set index for monitoring of the search space, etc. For example, the following information may be included.

TABLE 10

```
SearchSpace ::=                     SEQUENCE {
  -- Identity of the search space. SearchSpaceId = 0
      identifies the SearchSpace configured via PBCH (MIB) or
      ServingCellConfigCommon.
    searchSpaceId                        SearchSpaceId,
    (Search space identifier)
  controlResourceSetId                   ControlResourceSetId,
    (Control resource set identifier)
  monitoringSlotPeriodicityAndOffset       CHOICE {
    (Monitoring slot level period)
      sl1                                NULL,
      sl2                                INTEGER (0..1),
      sl4                                INTEGER (0..3),
      sl5                         INTEGER (0..4),
      sl8                                INTEGER (0..7),
      sl10                               INTEGER (0..9),
      sl16                               INTEGER (0..15),
      sl20                                 NTEGER (0..19)
  }
                                    OPTIONAL,
    duration(monitoring duration)                  INTEGER
      (2..2559)
  monitoringSymbolsWithinSlot              BIT STRING (SIZE
      (14))                                       OPTIONAL,
    (Monitoring symbol in slot)
  nrofCandidates                         SEQUENCE {
    (The number of PDCCH candidates for each aggregation level)
      aggregationLevel1                  ENUMERATED {n0, n1, n2,
      n3, n4, n5, n6, n8},
      aggregationLevel2                  ENUMERATED {n0, n1, n2,
      n3, n4, n5, n6, n8},
      aggregationLevel4                  ENUMERATED {n0, n1, n2,
      n3, n4, n5, n6, n8},
      aggregationLevel8                  ENUMERATED {n0, n1, n2,
      n3, n4, n5, n6, n8},
      aggregationLevel16                   ENUMERATED {n0, n1,
      n2, n3, n4, n5, n6, n8}
  },
  searchSpaceType                        CHOICE {
    (Search space type)
      -- Configures this search space as common search space
      (CSS) and DCI formats to monitor.
      common                             SEQUENCE {
    (Common search type)
        }
      ue-Specific                        SEQUENCE {
    (UE-specific search type)
        -- Indicates whether the UE monitors in this USS for DCI
      formats 0-0 and 1-0 or for formats 0-1 and 1-1.
        formats                            ENUMERATED {formats0-
      0-And-1-0, formats0-1-And-1-1},
        ...
      }
```

According to the configuration information, the base station may configure one or multiple search space sets for the terminal. According to some embodiments, the base station may configure search space set 1 and search space set 2 for the terminal, may configure DCI format A, which is scrambled with an X-RNTI in search space set 1, to be monitored in the common search space, and may configure DCI format B, which is scrambled with a Y-RNTI in search space set 2, to be monitored in the UE-specific search space.

According to the configuration information, one or multiple search space sets may exist in the common search space or the UE-specific search space. For example, search space set #1 and search space set #2 may be configured to be the common search space, and search space set #3 and search space set #4 may be configured to be the UE-specific search space.

In the common search space, the following combinations of DCI formats and RNTIs may be monitored. Of course, the disclosure is not limited to the following examples.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In the UE-specific search space, the following combinations of DCI formats and RNTIs may be monitored. Of course, the disclosure is not limited to the following examples.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The RNTIs specified above may follow the following definitions and uses.

Cell RNTI (C-RNTI): used for UE-specific PDSCH scheduling

Temporary cell RNTI (TC-RNTI): used for UE-specific PDSCH scheduling

Configured scheduling RNTI (CS-RNTI): used for semi-statically configured UE-specific PDSCH scheduling Random Access RNTI (RA-RNTI): used for scheduling PDSCH at random access stage Paging RNTI (P-RNTI): used for scheduling PDSCH on which paging is transmitted System Information RNTI (SI-RNTI): used for scheduling PDSCH on which system information is transmitted Interruption RNTI (INT-RNTI): used for indicating whether to puncture PDSCH Transmit power control for PUSCH RNTI (TPC-PUSCH-RNTI): used for indicating power control command for PUSCH Transmit power control for PUCCH RNTI (TPC-PUCCH-RNTI): used for indicating power control command for PUCCH Transmit power control for SRS RNTI (TPC-SRS-RNTI): used for indicating power control command for SRS The DCI formats specified above may follow the definition below.

TABLE 11

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |

TABLE 11-continued

| DCI format | Usage |
|---|---|
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G, control resource set p and a search space of aggregation level L in control resource set s may be expressed as Equation below.

$$L\cdot\left\{\left(Y_{p,n^{u}_{s,f}}+\left\lfloor\frac{m_{s,n_{CI}}\cdot N_{CCE,p}}{L\cdot M^{(L)}_{p,s,max}}\right\rfloor+n_{CI}\right)\bmod\lfloor N_{CCE,p}/L\rfloor\right\}+i \quad \text{Equation 1}$$

L: aggregation level $n_{CI}$: carrier index $N_{CCE,p}$: the total number of CCEs existing in control resource set p $n^{\mu}_{s,f}$: slot index $M^{(L)}_{p,s,max}$: the number of PDCCH candidates of aggregation level L $m_{snCI}=0, \ldots, M^{(L)}_{p,s,max}-1$: the indices of PDCCH candidates of aggregation level L $$i=0,\ldots,L-1$$

$$Y_{p},n^{\mu}_{s,f}=\left(A_{p}\cdot Y_{p,n^{\mu}_{sf}-1}\right)\bmod D,\ Y_{p,-1}=n_{RNTI}\neq 0,\ A_{0}=39827,$$

$$A_{1}-39829,\ A_{2}=39839,\ D=65537$$

$n_{RNTI}$: terminal identifier

A value of Y_(p,$n^{\mu}_{s,f}$) may correspond to 0 in the case of a common search space.

In the case of the UE-specific search space, a value of Y_(p,$n^{\mu}_{s,f}$) may correspond to a value that varies depending on a time index and the identity (ID configured for the terminal by the base station or C-RNTI) of the terminal.

In 5G, multiple search space sets may be configured by different parameters (e.g., parameters in Table 10), and therefore a set of search spaces monitored by the terminal at each time point may vary. For example, when search space set #1 is configured in an X-slot period, search space set #2 is configured in a Y-slot period, and X and Y are different from each other, the terminal may monitor both search space set #1 and search space set #2 in a specific slot, and may monitor one of search space set #1 and search space set #2 in a specific slot.

When multiple search space sets are configured for the terminal, the following conditions may be considered for a method of determining a search space set required to be monitored by the terminal.

Condition 1: Limiting the Maximum Number of PDCCH Candidates

The number of PDCCH candidates that may be monitored per slot does not exceed $M^{\mu}$. $M^{\mu}$ may be defined by the maximum number of PDCCH candidate per slot in a cell configured to a subcarrier spacing of $15\cdot 2^{\mu}$ kHz, and may be defined by the following table.

TABLE 12

| μ | Maximum number of PDCCH candidates per slot and per serving cell ($M^{\mu}$) |
|---|---|
| 0 | 44 |
| 1 | 36 |
| 2 | 22 |
| 3 | 20 |

Condition 2: Limiting the Maximum Number of CCEs

The number of CCEs constituting the entire search space (here, the entire search space refers to the entire CCE set corresponding to a union area of multiple search space sets) per slot does not exceed $C^{\mu}$. $C^{\mu}$ may be defined by the maximum number of CCEs per slot in a cell configured to a subcarrier spacing of $15 \cdot 2^{\mu}$ kHz, and may be defined in the following table.

TABLE 13

| μ | Maximum number of CCEs per slot and per serving cell ($C^{\mu}$) |
|---|---|
| 0 | 56 |
| 1 | 56 |
| 2 | 48 |
| 3 | 32 |

For the convenience of description, a situation in which both conditions 1 and 2 are satisfied at a specific time point is defined as "condition A". Therefore, not satisfying condition A may refer to not satisfying at least one of the above conditions 1 and 2.

According to configurations of the search space sets by the base station, a case in which condition A is not satisfied at a specific time point may occur. If condition A is not satisfied at a specific time point, the terminal may select and monitor only some of the search space sets configured to satisfy condition A at the corresponding time point, and the base station may transmit a PDCCH in the selected search space sets.

A method of selecting some search spaces from among the entire configured search space sets may conform to the following methods.

Method 1

If condition A for the PDCCH fails to be satisfied in a particular time point (slot), The terminal (or base station) may select a search space set, a type of which has been configured to be the common search space, over a search space set configured for the UE-specific search space, from among the search space sets that exist at the corresponding time point.

If all the search space sets configured to be the common search space are selected (that is, if condition A is satisfied even after all the search spaces configured to be the common search space are selected), the terminal (or base station) may select the search space sets configured as the UE-specific search space. If there are multiple search space sets configured to be the UE-specific search spaces, a search space set having a low search space set index may have a higher priority. In consideration of the priority, the UE-specific search space sets may be selected within a range in which condition A is satisfied.

Figure 6:
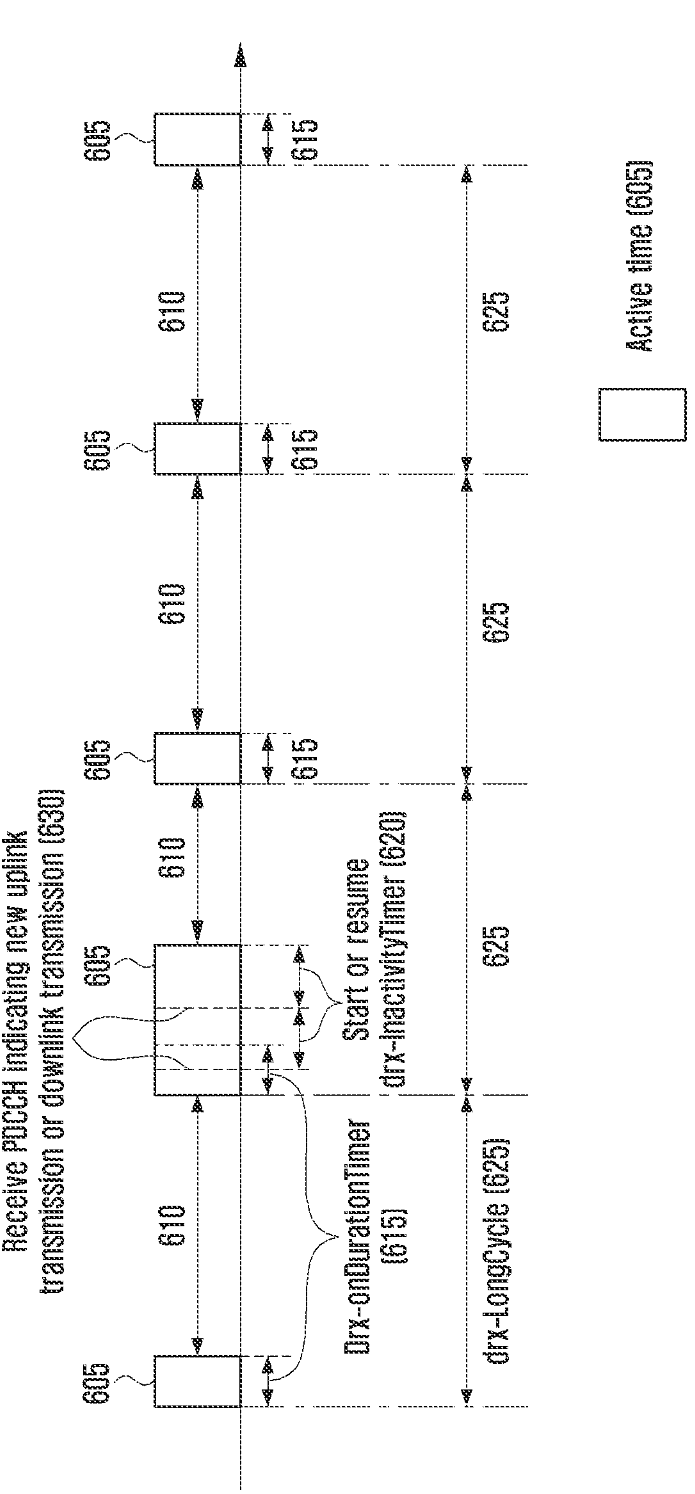
FIG. 6 is a diagram illustrating an example of a DRX operation in 5G according to an embodiment of the disclosure.

FIG. 6 is a diagram illustrating discontinuous reception (DRX).

Discontinuous reception (DRX) is an operation in which a terminal using a service discontinuously receives data in an RRC connected state in which a radio link is established between a base station and the terminal. When DRX is applied, the terminal turns on a receiver at a specific time point to monitor a control channel, and if there is no data received for a certain period of time, the terminal turns off the receiver to reduce power consumption of the terminal. DRX operation may be controlled by a MAC layer device, based on various parameters and timers.

Referring to FIG. 6, an active time 605 is a time during which the terminal wakes up in each DRX cycle and monitors a PDCCH. The active time 605 may be defined as follows.

drx-onDurationTimer or drx-InactivityTimer or drx-RetransmissionTimerDL or drx-RetransmissionTimerUL or ra-ContentionResolutionTimer is running;

a Scheduling Request is sent on PUCCH and is pending; or a PDCCH indicating a new transmission addressed to the C-RNTI of the MAC entity has not been received after successful reception of a Random Access Response for the Random Access Preamble not selected by the MAC entity among the contention-based Random Access Preamble.

rx-onDurationTimer, drx-InactivityTimer, drx-RetransmissionTimerDL, drx-RetransmissionTimerUL, ra-ContentionResolutionTimer and the like, are timers, the values of which are configured by the base station, and have a function for configuring the terminal to monitor a PDCCH when a predetermined condition is satisfied.

drx-onDurationTimer 615 is a parameter for configuration of a minimum time in which the terminal is awake in the DRX cycle. drx-InactivityTimer 620 is a parameter for configuration of an additional time during which the terminal is awake when a PDCCH indicating new uplink transmission or downlink transmission is received 630. drx-RetransmissionTimerDL is a parameter for configuration of a maximum time during which the terminal is awake to receive downlink retransmission in a downlink HARQ procedure. drx-RetransmissionTimerUL is a parameter for configuration of a maximum time during which the terminal is awake to receive an uplink retransmission grant in an uplink HARQ procedure. drx-onDurationTimer, drx-InactivityTimer, drx-RetransmissionTimerDL and drx-RetransmissionTimerUL may be configured to, for example, time, the number of subframes, the number of slots, and the like. ra-ContentionResolutionTimer is a parameter for monitoring of the PDCCH in a random access procedure.

inActive time 610 is a time configured not to monitor a PDCCH or a time configured not to receive a PDCCH during the DRX operation, and inActive time 610 may be a time remaining after excluding the Active time 605 from the total time for performing the DRX operation. If the terminal does not monitor the PDCCH during active time 605, the terminal may enter a sleep or inActive state so as to reduce power consumption.

A DRX cycle refers to a cycle in which the terminal wakes up and monitors the PDCCH. That is, the DRX cycle refers to a time interval from after the terminal monitors the PDCCH to a time point of monitoring a subsequent PDCCH, or an occurrence cycle of on-duration. There are two types of the DRX cycle, which are a short DRX cycle and a long DRX cycle. The short DRX cycle may be optionally applied.

A long DRX cycle 625 is a longer cycle among the two DRX cycles configured for the terminal. While operation in the long DRX, the terminal starts drx-onDurationTimer 615 again at a time point at which the long DRX cycle 625 has elapsed from a start point (e.g., a start symbol) of drx-onDurationTimer 615. When operating in the long DRX cycle 625, the terminal may start drx-onDurationTimer 615 in a slot subsequent to drx-SlotOffset in a subframe satisfying Equation 2 below. Here, drx-SlotOffset refers to a delay before starting drx-onDurationTimer 615. drx-SlotOffset may be configured with, for example, time, the number of slots, and the like.

[(SFN×10)+subframe number]modulo(drx-LongCycle)=drx-StartOffset    Equation 2

In this case, drx-LongCycleStartOffset may include the long DRX cycle 625 and drx-StartOffset, and may be used to define a subframe to start the long DRX cycle 625. drx-LongCycleStartOffset may be configured with, for example, time, the number of subframes, the number of slots, and the like.

Hereinafter, a carrier aggregation and scheduling method in the 5G communication system will be described in detail.

The terminal may be configured with multiple cells (cells or component carriers (CCs)) from the base station and may be configured whether to perform cross-carrier scheduling on cells configured for the terminal. If the cross-carrier scheduling is configured for a specific cell (cell A or a scheduled cell), PDCCH monitoring for cell A may not be performed in cell A, but may be performed in other cells (cell B or a scheduling cell) indicated by the cross-carrier scheduling. In this case, the scheduled cell (cell A) and the scheduling cell (cell B) may be configured by different numerologies. The numerology may include a subcarrier spacing, a cyclic prefix, and the like. If the numerologies of cell A and cell B are different from each other, the following minimum scheduling offset may be additionally considered between the PDCCH and the PDSCH when the PDCCH of cell B schedules the PDSCH of cell A.

Cross-Carrier Scheduling Method

- If a subcarrier spacing ($\mu_B$) of cell B is less than a subcarrier spacing ($\mu_A$) of cell A, the PDSCH may be scheduled from a subsequent PDSCH slot that corresponds to X symbols after from the last symbol of the PDCCH received in cell B. Here, X may vary according to $\mu_B$, wherein X=4 symbols may be defined when $\mu_B$=15 kHz, X=4 symbols may be defined when $\mu_B$=30 kHz, and X=8 symbols may be defined when $\mu_B$=60 kHz.
- If the subcarrier spacing ($\mu_B$) of cell B is greater than subcarrier spacing ($\mu_A$) of cell A, the PDSCH may be scheduled from a time point corresponding to X symbols after the last symbofl of the PDCCH received in cell B. Here, X may vary according to $\mu_B$, wherein X=4 symbols may be defined when $\mu_B$=30 kHz, X=8 symbols may be defined when $\mu_B$=60 kHz, and X=12 symbols may be defined when $\mu_B$=120 kHz.

Hereinafter, an embodiment of the disclosure will be described in detail with the accompanying drawings. Hereinafter, an embodiment of the disclosure will be described using a 5G system as an example, but the embodiment of the disclosure may also be applied to other communication systems having a similar technical background or channel type. For example, LTE or LTE-A mobile communication and a mobile communication technology developed after 5G may be included therein. Therefore, an embodiment of the disclosure may be applied to other communication systems via some modifications without departing from the scope of the disclosure, according to determination by those skilled in the art.

In addition, in describing the disclosure, when it is determined that a detailed description of a related function or configuration may unnecessarily obscure the subject matter of the disclosure, the detailed description thereof will be omitted. Terms to be described hereinafter are terms defined in consideration of functions in the disclosure, and may vary depending on intention or usage of users or operators. Therefore, the definition should be based on contents throughout the specification.

Hereinafter, in describing the disclosure, higher layer signaling may be signaling corresponding to at least one of the following signaling types or a combination of one or more thereof.

- Master information block (MIB)
- System information block (SIB) or SIB X (X=1, 2, . . . )
- Radio resource control (RRC)
- Medium access control (MAC) control element (CE)

In addition, L1 signaling may be signaling corresponding to at least one of signaling methods using the following physical layer channels or signaling types or a combination of one or more thereof.

- Physical downlink control channel (PDCCH)
- Downlink control information (DCI)
- UE-specific DCI
- Group common DCI
- Common DCI
- Scheduling DCI (e.g., DCI used for scheduling downlink or uplink data)
- Non-scheduling DCI (e.g., DCI not for the purpose of scheduling downlink or uplink data)
- Physical uplink control channel (PUCCH)
- Uplink control information (UCI)

In describing the disclosure, functions below will be defined and used.

- min(A,B): A function to output a smaller value among A and B
- max(A,B): A function to output a larger value among A and B
- ceil(X): A function to output a smallest integer among integers larger than X
- floor(X): A function to output a largest integer among integers smaller than X Hereinafter, a method for allocating a time domain resource for a data channel in the next-generation mobile communication system (5G or NR system) according to various embodiments of the disclosure will be described with reference to the drawings.

The base station may configure, for the terminal, a table for time domain resource allocation information with respect to a physical downlink shared channel (PDSCH) and a physical uplink shared channel (PUSCH) via higher layer signaling (e.g., SIB or RRC signaling). A table including up to 16 entries (maxNrofDL-Allocations=16) may be configured for the PDSCH, and a table including up to 16 entries (maxNroflUL-Allocations=16) may be configured for the PUSCH. The time domain resource allocation information may include, for example, a PDCCH-to-PDSCH slot timing (corresponding to a time interval in units of slots between a time point at which a physical downlink control channel (PDCCH) is received and a time point at which a PDSCH scheduled by the received PDCCH is transmitted, and denoted as K0), a PDCCH-to-PUSCH slot timing (corresponding to a time interval in units of slots between a time point at which a PDCCH is received and a time point at which a PUSCH scheduled by the received PDCCH is transmitted, and denoted as K2), information relating to the position and the length of a start symbol in the slot, in which the PDSCH or the PUSCH is scheduled, a mapping type of the PDSCH or the PUSCH, etc. For example, information as in the following tables may be notified from the base station to the terminal (see the aforementioned Table 7 and Table 8).

According to an embodiment of the disclosure, the base station may notify one of the entries in the tables for the time domain resource allocation information to the terminal via L1 signaling (e.g., DCI) (e.g., the entry may be indicated by a "time domain resource allocation" field in DCI). The terminal may acquire the time domain resource allocation information for the PDSCH or PUSCH, based on the DCI received from the base station.

If an entry in which K0/K2 has a value of 0 is indicated, this may refer to that a PDCCH and a data channel are scheduled in the same slot. This is referred to as "self-slot scheduling".

If an entry in which K0/K2 has a value is larger than 0 is indicated, this refers to that a PDCCH and a data channel are scheduled in different slots. This is referred to as "cross-slot scheduling".

In the next-generation mobile communication system (5G or NR system), for the purpose of reducing power consumption of the terminal, the cross-slot scheduling may be used. If the cross-slot scheduling is supported, the terminal may operate in a sleep mode between a time point at which a PDCCH is received and a time point at which a data channel transmission or reception occurs, and power consumption can be reduced accordingly. In addition, when the cross-slot scheduling is supported, the terminal may spend a longer time for processing the PDCCH, thereby slowing down an operation speed and reducing power consumption. The time domain scheduling information for the PDSCH may be finally acquired when decoding is completed after PDCCH reception. Therefore, during a time interval for receiving and decoding the PDCCH, the terminal is unable to identify whether the PDSCH is scheduled, and thus buffering for OFDM symbols, in which the PDSCH may be scheduled, needs to be performed, so that the power consumption of the terminal may be largely increased. If the terminal is able to identify the time domain resource allocation information of the PDSCH before decoding the PDCCH, that is, if the terminal is able to identify that cross-slot scheduling is performed in advance, the terminal may minimize unnecessary buffering for the PDSCH, so that the power consumption may be reduced.

In order to reduce power consumption of the terminal, the base station may indicate, to the terminal via higher layer signaling or L1 signaling, a minimum K0/K2 value to be used for data channel scheduling. The terminal may expect that the scheduling is always performed by using the K0/K2 value corresponding to a value equal to or larger than the minimum K0/K2 value received from the base station. For convenience of description, the minimum K0/K2 value indicated to the terminal by the base station is referred to as a "minimum offset".

The minimum offset value may be indicated to the terminal by the base station via DCI (e.g., DCI format 1_1 or DCI format 0_1) for scheduling of the PDSCH or the PUSCH or via non-scheduling DCI (e.g., a new DCI format defined for reducing power consumption, a new RNTI defined for reducing power consumption, DCI format 2_0, DCI format 2_1, or the like). The terminal may receive, from the base station, different values for a minimum offset value $K0_{min}$ for K0 and a minimum offset value $K2_{min}$ for K2 separately, or may receive a single value for the K0 and the $K2_{min}$ imum offset value ($K_{min}$).

In some embodiments of the disclosure, the terminal may separately receive, from the base station, different values for the minimum offset value $K0_{min}$ for K0 and the minimum offset value $K2_{min}$ for K2. That is, the terminal may be configured with sets of candidate values for $K0_{min}$ and $K2_{min}$, respectively. $K0_{min}$ may be indicated to the terminal in a DL DCI format (e.g., DCI format 1_1), and $K2_{min}$ may be indicated to the terminal in a UL DCI format (e.g., DCI format 0_1). For application delays for received $K0_{min}$ and $K2_{min}$, the terminal may assume application delay #0 and application delay #2, which are different from each other, respectively. The terminal may relax a PDCCH processing time only within application delay #0 and may not relax the PDCCH processing time within application delay #2. Alternatively, the terminal may assume a single application delay for the received application delays for $K0_{min}$ and $K2_{min}$, and in this case, the application delay may be determined by a function for $K0_{min}$.

In some embodiments of the disclosure, the terminal may receive a single value as the minimum offset value ($K_{min}$) for K0 and K2 from the base station. The terminal may be configured with a set of candidate values for $K_{min}$, which is to be commonly applied to K0 and K2. $K_{min}$ may be indicated to the terminal in the DL DCI format (e.g., DCI format 1_1) and/or the UL DCI format (e.g., DCI format 0_1).

In some embodiments of the disclosure, the terminal may be configured, via higher layer signaling, whether to separately receive the minimum offset values for K0 and K2 or to receive the same as a single value from the base station.

In the disclosure, a case in which a single minimum offset value, $K_{min}$, is indicated is assumed and described, but the details of the disclosure may be applied in the same manner also to a case in which $K0_{min}$ and $K2_{min}$ are separately indicated.

According to an embodiment of the disclosure, the terminal may expect, based on the minimum offset received from the base station, that scheduling is to be performed with only an entry in which K0/K2 has a value equal to or larger than the indicated minimum offset value, among values in the pre-configured time domain resource allocation table. For example, a case in which the base station has configured, for the terminal, the following time domain resource allocation table for the PDSCH is assumed.

TABLE 14

| Entry index | PDSCH mapping type | K0 | Sarting symbol | Legnth |
|---|---|---|---|---|
| 1 | Type A | 0 | 2 | 8 |
| 2 | Type A | 0 | 2 | 10 |
| 3 | Type A | 1 | 2 | 9 |
| 4 | Type A | 1 | 2 | 7 |
| 5 | Type A | 2 | 2 | 5 |
| 6 | Type B | 2 | 9 | 4 |
| 7 | Type B | 3 | 4 | 4 |
| 8 | Type B | 4 | 5 | 7 |
| 9 | Type B | 5 | 5 | 2 |
| 10 | Type B | 7 | 9 | 2 |
| 11 | Type B | 8 | 12 | 1 |
| 12 | Type A | 9 | 1 | 10 |
| 13 | Type A | 10 | 1 | 6 |
| 14 | Type A | 21 | 2 | 4 |
| 15 | Type B | 30 | 4 | 7 |
| 16 | Type B | 32 | 8 | 4 |

If the base station indicates the minimum offset value of 3 to the terminal, the terminal may expect that scheduling is not performed with entries in which K0 has a value smaller than 3, that is, entry indices 1, 2, 3, 4, 5, and 6, and may expect that scheduling is to be performed with the remaining entries, that is, entry indices 7, 8, . . . , and 16. For convenience of description, the following terms are defined.

Valid entry: A valid entry is an entry in which K0/K2 has a value equal to or larger than the received minimum offset value, among values in the pre-configured time domain resource allocation table, and the valid entry may be used for scheduling.

Invalid entry: An invalid entry is an entry in which K0/K2 has a value smaller than the received minimum offset, among values in the pre-configured time domain resource allocation table, and the invalid entry may not be used for scheduling.

According to an embodiment of the disclosure, the terminal may be configured with candidate values, for example, $K_{min}(0)$, $K_{min}(1)$, . . . , $K_{min}(N-1)$, for N minimum offset values via higher layer signaling from the base station, and may be indicated, via L1 signaling, one of the configured N minimum offset values. For example, two minimum offset values may be configured to $K_{min}(0)=2$ and $K_{min}(1)=4$, one of $K_{-min}(0)$ or $K_{min}(1)$ may be indicated to the terminal via a 1-bit indicator of L1 signaling (e.g., DCI, DCI format 0_1/1_1, etc.). As another example, a single minimum offset value of $K_{min}(1)=4$ may be configured, in which case, $K_{min}(0)=0$ or $K_{min}(0)$ may be regarded as an operation that does not consider any restrictions in the time domain resource allocation table (i.e., it is assumed that all entries in the preconfigured time domain resource allocation table are valid entries), and in this case the base station may indicate, to the terminal, one of $K_{-min}(0)$ or $K_{min}(1)$ via a 1-bit indicator of L1 signaling (e.g., DCI, DCI format 0_1/1_1, etc.).

According to an embodiment of the disclosure, the terminal may receive, from the base station, the minimum offset value via DCI transmitted at a particular time point, and may apply the received minimum offset value after a particular time point from a time point at which the minimum offset value is received. For example, the minimum offset value may be indicated to the terminal by the base station via DCI received through the PDCCH transmitted at time point $T_0$, and the terminal may apply content of the newly acquired minimum offset value from a time point ($T_{app}$) after a particular time ($T_{delay}$) passes. In this case, $T_{app}$ may be expressed by using a function for $T_0$ and $T_{delay}$. If the terminal has received DCI indicating the minimum offset value from time point $T_0$ from the base station, the terminal may not expect that the indicated minimum offset value is applied before $T_{app}$. Here, applying the minimum offset value may correspond to a terminal operation of performing application by determining, as valid or invalid entries, the entries of the time domain resource allocation table configured via higher layer signaling, based on the received minimum offset value.

Figure 7:
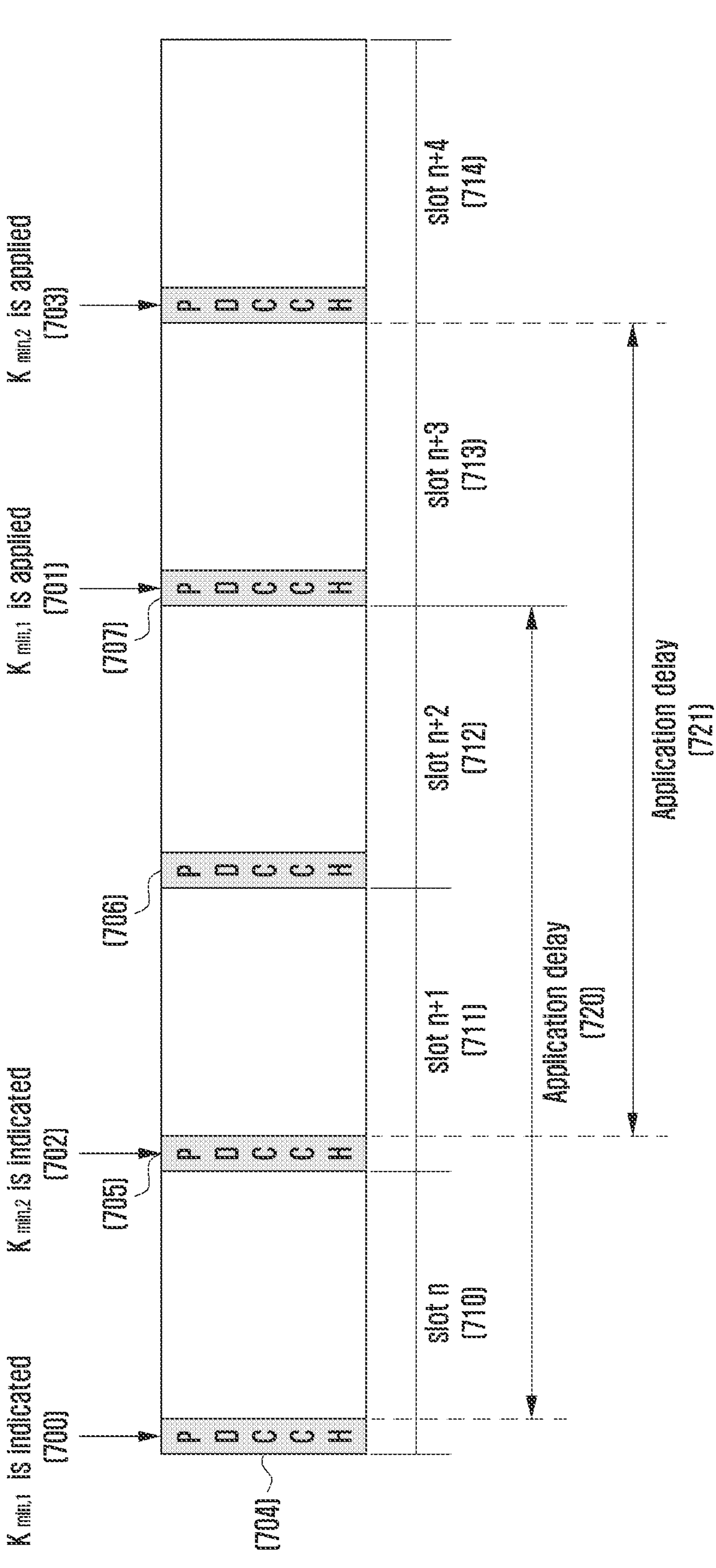
FIG. 7 is a diagram illustrating an example of a cross-slot scheduling method according to an embodiment of the disclosure.

FIG. 7 is a diagram illustrating an example of a cross-slot scheduling method according to an embodiment of the disclosure. As described above, the base station may indicate, in 700, to the terminal via DCI, the minimum offset value, $K_{min}$, through a PDCCH 704 transmitted at a specific time point. $K_{min}$ may be indicated to the terminal by the base station through the PDCCH 704 at time point $T_0$ (corresponding to slot n 710 in an example of FIG. 7). The terminal may apply the $K_{min}$ value received from the base station, from time point $T_{app}$ after a predetermined time ($T_{delay}$) passes from $T_0$(corresponding to slot n 710 in an example of FIG. 7) at which $K_{min}$ is received. An example of FIG. 7 shows that the terminal applies $K_{min}$ received in slot n 710, in slot n+k(k=3) 713. A time interval between a time point at which $K_{min}$ is received and a time point at which $K_{min}$ is applied is referred to as an "application delay 720", and is indicated as $T_{delay}$.

The terminal may operate in a "power reduction mode" during the aforementioned application delay, a time indicated by a minimum offset, or a specific time interval. Here, the terminal operating in a power reduction mode may refer to that the terminal operates according to at least one of or a combination of one or more of the following operations.

An operation of reducing power consumption by increasing a PDCCH processing time An operation of reducing power consumption by not performing buffering for an OFDM symbol An operation of reducing power consumption by operating in a sleep mode That is, by considering the aforementioned application delay, power consumption of the terminal may be reduced.

The aforementioned application delay may be determined according to, for example, a function of the following parameters.

PDCCH subcarrier spacing (μ0)

PDSCH subcarrier spacing (μ1)

PUSCH subcarrier spacing (μ2)

PDCCH processing time ($T_{proc1}$)

Relaxed PDCCH processing time (corresponding to a longer time than the PDCCH processing time) ($T_{proc2}$)

PDCCH-related configuration information (for example, the position of a starting or last symbol of the PDCCH), CORESET-related configuration information (a CORESET symbol length, CORESET frequency allocation information, precoding-related configuration information, etc.), search space-related configuration information (a slot-unit monitoring period and offset, a symbol-unit monitoring occasion, the number of PDCCH candidates, etc.)

A minimum value of an application delay ($T_{delay,min}$)

A maximum value of an application delay ($T_{delay,max}$)

Whether cross-carrier scheduling is configured

A minimum value of a PDSCH scheduling offset ($K0_{min,2}$)

A minimum value of a PUSCH scheduling offset ($K2_{min,2}$)

A minimum offset value assumed by a terminal before a newly indicated minimum offset value (i.e., a minimum offset value assumed by a terminal at a time point ($T_0$) at which the minimum offset value is received) ($K0_{min,pre}$, $K2_{min,pre}$, and $K_{min,pre}$)

Hereinafter, various embodiments of a method for determining the aforementioned application delay will be described.

In describing the disclosure, parameters below will be defined and used.

$T_0$: A time point at which DCI including a minimum offset value is received $T_{delay}$: An application delay $T_{app}$: A time point at which the received minimum offset value is applied According to an embodiment of the disclosure, an application delay ($T_{delay}$) in slot n may be expressed using a function of a PDCCH subcarrier spacing (μ0), a PDSCH subcarrier spacing (μ1), or a PUSCH subcarrier spacing (μ2), a minimum value ($T_{delay,min}$) of an application delay, and a minimum offset value ($K_{min,pre}$) assumed by the terminal in slot n.

According to an embodiment of the disclosure, a time point ($T_0$) at which DCI indicating the minimum offset is received and an application delay ($T_{delay}$) may be defined in units of slots. For example, if the terminal acquires an indicator for the minimum offset value at $T_0$(=slot n), the terminal may apply the newly indicated minimum offset value from $T_{app}=T_0$(=slot n)$+T_{delay}$.

According to an embodiment of the disclosure, scaling may be applied to the application delay ($T_{delay}$) by considering a subcarrier spacing of a PDCCH, PDSCH, or PUSCH, and by considering a situation in which a control channel has a subcarrier spacing different from that of a data channel. More specifically, if the terminal has received DCI including an indicator for the minimum offset in slot n with reference to the PDCCH subcarrier spacing (μ0), and the PDSCH or PUSCH subcarrier spacing scheduled by the corresponding DCI is μ1 or μ2, a time point at which the minimum offset is to be applied after the application delay ($T_{delay}$) may be determined by reconverting a slot index. A scaling parameter, S, may be considered to reconvert the slot index. For example, when a PDCCH including an indicator for the minimum offset is received in slot n, the newly indicated minimum offset value may be applied from g((slot n+$T_{delay}$)*S). Here, g( ) may correspond to any function. In an example, S may correspond to a scaling parameter based on a subcarrier spacing of a data channel, and may be defined as, for example, $S=2^{(\mu1-\mu0)}$ (or $S=2^{(\mu2-\mu0)}$). In another example, S may correspond to a scaling parameter based on the minimum value (or the maximum value) of subcarrier spacings of the data channel and the PDCCH, and may be determined as, for example, $S=2^{(\mu ref-\mu0)}$, μref=min(μ0, μ1) (or μref=min(μ0, μ2)), or $S=2^{(\mu ref-\mu0)}$, μref=max(μ0, μ1) (or μref=max(μ0, μ2)).

According to an embodiment of the disclosure, in determination of the application delay ($T_{delay}$), the minimum offset value ($K_{min,pre}$) assumed by the terminal before the newly indicated minimum offset value may be considered. For example, $T_{delay}$ may be expressed using a function for $T_{min,pre}$. This may be more advantageous in reducing power consumption of the terminal. More specifically, for example, if the terminal assumes $T_{min,pre}$=X, the terminal may operate, spending a longer PDCCH processing time according to an X value in order to reduce power consumption of the terminal. For example, the terminal may perform decoding for the PDCCH by extending the PDCCH processing time by X. In this case, a time point at which the terminal completes decoding for DCI indicating a new minimum offset value may be after X, and accordingly, the terminal may acquire the new minimum offset value after X. Accordingly, application delay $T_{delay}$ may have a value at least equal to or larger than X. Therefore, defining the application delay ($T_{delay}$) by considering $T_{min,pre}$ may be more advantageous in increasing an effect of reducing power consumption of the terminal.

According to an embodiment of the disclosure, in determining the application delay ($T_{delay}$), the minimum application delay ($T_{delay,min}$) may be considered. $T_{delay,min}$ may correspond to the minimum value of the application delay that the terminal may assume, and may be defined as a value satisfying $T_{delay,min}\geq 0$. If $T_{delay}=T_{delay,min}=0$, it may refer to that the terminal applies the received minimum offset value in a slot in which the corresponding minimum offset value has been received. A value of $T_{delay,min}$ may be configured for the terminal by the base station via higher layer signaling or may be defined to a fixed value.

In consideration of the aforementioned parameters, the application delay ($T_{delay}$) and a time point ($T_{app}$) to which a newly indicated minimum offset is applied may be determined according to the following equation. Each parameter in the equation below may follow the details of the aforementioned embodiment.

$$T_{app} = \text{ceil}(T_0 + T_{delay}) * S \text{ where } T_{delay} = \max(K_{min,pre}, T_{delay,min}) \quad \text{Equation 3}$$

The application delay described in Equation 3 above is merely an example, and may be expressed by various equations.

According to an embodiment of the disclosure, during a time interval corresponding to the application delay, if there exists a PDCCH monitoring occasion configured, by the base station, to perform monitoring, the terminal may monitor a PDCCH according to the configuration, and may additionally receive an indicator for $K_{min}$ via DCI transmitted within the application delay. When described in detail by taking FIG. 7 as an example, the terminal may receive $K_{min,1}$ via DCI transmitted in a PDCCH monitoring occasion 704 of slot n 710 (operation 700). The terminal may apply $K_{min,1}$ in a slot (slot n+3 713 in FIG. 7) after an application delay 720 with respect to $K_{min}$ received in the PDCCH monitoring occasion 704 (operation 701). The terminal may monitor a PDCCH monitoring occasion 705 in another slot n+1 711 within the application delay corresponding to 720 and may additionally receive $K_{min,2}$ via DCI transmitted in the PDCCH monitoring occasion of 705 (operation 702). The terminal may apply $K_{min,2}$ in a slot (slot n+4 714 in FIG. 7) after an application delay 721 with respect to $K_{min}$ received in PDCCH monitoring 703 (occasion 703). As a result, the terminal may assume $K_{min,1}$ as a minimum offset value in slot n+3 713, and may assume $K_{min,2}$ as a minimum offset value in slot n+4 714. That is, in some cases, a minimum offset value may be different for each slot.

As described above, if, before applying of the $K_{min}$ value (this is denoted as $K_{min,1}$) received on a PDCCH transmitted earlier, the terminal receives a new $K_{min}$ value (this is denoted as $K_{min,2}$) on a PDCCH transmitted thereafter and applies the same, there may be a disadvantage that power consumption reduction of the terminal may be decreased. When described by taking FIG. 7 as an example, the terminal may assume $K_{min,1}$ in slot n+3 and $K_{min,2}$ in slot n+4. The terminal may adjust a processing operation speed for the PDCCH according to the assumption of a minimum offset value in each slot, and may increase the processing operation speed for the PDCCH to a greater extent as a minimum offset value in a corresponding slot is larger, and therefore power consumption reduction may be achieved. If $K_{min,1}$=4 and $K_{min,2}$=2 in the above example, the terminal may need to make a change to $K_{min,2}$=2 in slot n+4 while applying a processing time, which is obtained by assuming $K_{min,1}$=4, to PDCCH processing in slot n+3 and, accordingly, if processing for the PDCCH of slot n+3 exceeds that of slot n+4, assumption cannot be made to existing $K_{min,1}$=4, and power consumption reduction may be decreased.

In the current 5G, in scheduling for a data channel, out-of-order scheduling is not allowed as follows.

For any two HARQ process IDs in a given scheduled cell, if the UE is scheduled to start receiving a first PDSCH starting in symbol j by a PDCCH ending in symbol i, the UE is not expected to be scheduled to receive a PDSCH starting earlier than the end of the first PDSCH with a PDCCH that ends later than symbol i.

For any two HARQ process IDs in a given scheduled cell, if the UE is scheduled to start a first PUSCH transmission starting in symbol j by a PDCCH ending in symbol i, the UE is not expected to be scheduled to transmit a PUSCH starting earlier than the end of the first PUSCH by a PDCCH that ends later than symbol i.

Based on the detail of the 5G standard described above, out-of-order scheduling may be defined as follows.

Out-of-Order Scheduling

With respect to PDSCHs having any two HARQ process IDs, in a case where a terminal, which is scheduled with a first PDSCH with start symbol j through a PDCCH with last symbol i, is scheduled with a PDSCH with a start symbol earlier than the last symbol of the first PDSCH through a PDCCH with a last symbol no later than i, With respect to PUSCHs having any two HARQ process IDs, in a case where a terminal, which is scheduled with a first PUSCH with start symbol j through a PDCCH with last symbol i, is scheduled with a PUSCH with a start symbol earlier than the last symbol of the first PUSCH through a PDCCH with a last symbol no later than i, As described above, in the case where, before applying of the $K_{min}$ value (this is denoted as $K_{min,1}$) received on a PDCCH transmitted earlier, the terminal receives a new $K_{min}$ value (this is denoted as $K_{min,2}$) on a PDCCH transmitted thereafter and applies the same, if $K_{min,2}$ is smaller than $K_{min,1}$, out-of-order scheduling may occur, and this may affect a data transmission/reception operation of the terminal.

Therefore, in order to solve the aforementioned problems, it may be necessary to limit a minimum offset value that the terminal may assume for each slot, or to limit a time point at which the minimum offset value may be updated. Hereinafter, various embodiments for solving the aforementioned problems will be described in detail.

1st Embodiment

According to some embodiments of the disclosure, the terminal may not expect a new minimum offset value to be indicated from a PDCCH transmitted during a time interval corresponding to an application delay. When described in detail with reference to FIG. 7, the terminal may receive, in 700, new minimum offset value $K_{min,1}$ in slot n 710 and may apply received $K_{min,1}$ in slot n+3 713 which is a time point after the application delay 720. In this case, the terminal may not expect that another minimum offset value ($K_{min}$) having a value different from $K_{min,1}$ is indicated from DCI transmitted in PDCCH monitoring occasions (705 and 706 in an example of FIG. 7) existing during the application delays 720 for received $K_{min,1}$. If the terminal has received a new minimum offset value from the PDCCH transmitted during the time interval corresponding to the application delay, an operation corresponding to one or a combination of one or more among the following operations may be performed.

Method 1: The terminal may regard received DCI as an error and ignore the entire contents of the received DCI.

Method 2: The terminal may ignore only a $K_{min}$ value of received DCI, determine that the remaining DCI contents are valid, and operate according to the contents of the DCI.

In the operation according to the aforementioned first embodiment of the disclosure, due to a DCI reception failure of the terminal, there may be a case where the understanding of a time interval in which a new minimum offset value cannot be indicated is different between the base station and the terminal.

When described in detail with reference to FIG. 8, the terminal in FIG. 8 may be configured with $K_{min}(0)=2$ and $K_{min}(1)=4$ by the base station, and a minimum offset value that the terminal assumes in slot 0 810 may be $K_{pre}=2$ 820. In the example of FIG. 8, the terminal may assume that an application delay (application delay, AD) for $K_{min}$ transmitted on a PDCCH in slot 0 810 is $T_{delay}=K_{pre}=2$. In an example of FIG. 8, the base station indicates $K_{min,1}=4$ 830 via DCI in slot 0 810, but the terminal has failed to receive the DCI. The base station may transmit the same minimum offset value, $K_{min,1}=K_{min,2}=4$, in slot 1 811 existing within an application delay 840 based on slot 0 810 in which the DCI has been transmitted. On the other hand, when the terminal has failed to receive the DCI transmitted in slot 0 810 but has received DCI transmitted in slot 1 811, an application delay, $T_{delay}=K_{pre}=2$ 841, may be assumed based on slot 1 811. Accordingly, the terminal may expect that minimum offset value $K_{min,3}$ 832 transmitted in slot 2 812 existing within the application delay 841 is the same as minimum offset value $K_{min,2}$ 831 transmitted in slot 1 811. However, the base station may transmit the same $K_{min}$ value in slot 0 810 and slot 1 811, and may transmit a different $K_{min}$ value, i.e., $K_{min,3}=2$ 832 in slot 2 812. In this case, there may be a case in which the terminal determines that $K_{min,3}$ 832 transmitted in slot 2 812 is an incorrect value so as to treat $K_{min,3}$ as an error and ignore the same.

Accordingly, a method for ensuring a common understanding between the terminal and the base station with respect to a time point or an application delay at which a new minimum offset value may be indicated (or may not be indicated) is disclosed.

1-1th Embodiment

According to some embodiments of the disclosure, the terminal may pre-configured with a time point at which a new minimum offset value may be indicated (or a time point at which an application delay is applied), by the base station via higher layer signaling. As an example, the base station may configure, to the terminal via higher layer signaling, information on a set of slot indices (or indices for a possible time resource unit, such as a symbol, a frame, a system frame, a PDCCH monitoring occasion index, etc.) enabling indication of a new minimum offset value. The aforementioned slot index is referred to as "minimum offset valid slot".

For example, the terminal may receive the following configurations from the base station.

TABLE 15

| Slot Index | 0 | 1 | 2 | 3 | 4 | 5 | 6 | 7 | 8 | 9 |
|---|---|---|---|---|---|---|---|---|---|---|
| Capability of indicating a minimum offset | ○ | X | ○ | X | ○ | X | ○ | X | ○ | X |

In the table, O may correspond to a slot in which a new minimum offset value may be indicated, and X may correspond to a slot in which no new minimum offset value may be indicated. That is, in Table 15, the terminal may expect to receive new minimum offset values via DCI transmitted in slot indices {0, 2, 4, 6, 8} and may expect to receive, in slot indices {1, 3, 5, 7, 9}, the same minimum offset values as values (if there are indicated values) indicated in slot indices {0, 2, 4, 6, 8}.

As another example, the terminal may be configured with information on a minimum offset valid slot index by the base station with respect to each of configured minimum offset candidate values, for example, $K_{min}(0)$, $K_{min}(1)$, . . . , $K_{min}(N-1)$. For example, if the terminal is configured with $K_{min}(0)=2$ and $K_{min}(1)=4$, the minimum offset valid slot may be configured as follows.

TABLE 16

| Slot Index | 0 | 1 | 2 | 3 | 4 | 5 | 6 | 7 | 8 | 9 |
|---|---|---|---|---|---|---|---|---|---|---|
| $K_{min}(0) = 2$ | ○ | X | ○ | X | ○ | X | ○ | X | ○ | X |
| $K_{min}(1) = 4$ | ○ | X | X | X | ○ | X | X | X | ○ | X |

As shown in Table 16, if multiple minimum offset valid slot index sets are configured, and a minimum offset value that the terminal currently assumes satisfies $K_{pre}=K_{min}(X)$, a minimum offset valid slot index configured for $K_{min}(X)$ may be assumed. For example, if $K_{pre}=2$, the terminal may assume {0, 2, 4, 6, 8} as the minimum offset valid slots corresponding to $K_{min}(0)=2$, and if $K_{pre}=4$, the terminal may assume {0, 4, 8} as the minimum offset valid slots corresponding to $K_{min}(1)=4$.

More specifically, information on minimum offset valid slots may be configured, for example, in the following manner.

Method 1: A bitmap and a period may be configured. For example, a pattern for minimum offset valid slots within P slots may be configured as a P-bit bitmap, and the corresponding bitmap pattern may be repeated in a P slot period. P may also be configured. For the minimum offset valid slots, a single set may be configured, or a total of N sets may be configured by configuration for each of the configured minimum offset values.

Method 2: A bitmap may be configured and a period may be implicitly determined. For example, the period may be implicitly determined by configured minimum offset candidate values or application delay. For example, period P may be determined to be M(≥1) times a minimum value (or maximum value) among the configured minimum offset candidate values of $K_{min}(0)$, $K_{min}(1)$, . . . , $K_{min}(N-1)$ (or application delay values that may be determined by the respective minimum offset candidate values). Alternatively, determination may be made to be M(≥1) times each of the configured minimum offset candidate values of $K_{min}(0)$, $K_{min}(1)$, . . . , $K_{min}(N-1)$, in which a total of N periods P(0), P(1), . . . , P(N−1) are configured, (or application delay values that may be determined by the respective minimum offset candidate values). With respect to the determined one or multiple Ps, a pattern for minimum offset valid slots within P slots may be configured as a P-bit bitmap, and the corresponding bitmap pattern may be repeated in a P slot period. For the minimum offset valid slots, a single set may be configured, or a total of N sets may be configured by configuration for each of the configured minimum offset values.

Method 3: An offset (or initial start point) and a period may be configured. For example, a period and an offset in units of slots (or equally a start time point of a period) may be configured.

Method 4: An offset (or initial start point) may be configured and a period may be implicitly determined. For example, an offset in units of slots (or equally a start time point of a period) may be configured, and a period may be implicitly determined by other system parameters. For example, period P may be determined to be M(≥1) times a minimum value (or maximum value) among the configured minimum offset candidate values of $K_{min}(0)$, $K_{min}(1)$, . . . , $K_{min}(N-1)$ (or application delay values that may be determined by the respective minimum offset candidate values). Alternatively, determination may be made to be M(≥1) times each of the configured minimum offset candidate values of $K_{min}(0)$, $K_{min}(1)$, . . . , $K_{min}(N-1)$, in which a total of N periods P(0), P(1), . . . , P(N−1) are configured, (or application delay values that may be determined by the respective minimum offset candidate values). For the offset, a single value may be configured, or a total of N values may be configured by configuration for each of the implicitly determined one or multiple periods Ps.

In the 1-1th embodiment of the disclosure, a slot index may be substituted with an index having a different time unit, for example, a symbol index, a frame index, or a system frame index, so as to be applied in the same manner.

In the 1-1th embodiment of the disclosure, the slot index may be substituted with an index related to PDCCH monitoring, for example, a PDCCH monitoring occasion index, so as to be applied in the same manner. For example, the PDCCH monitoring occasion index may correspond to a PDCCH monitoring occasion index for determination of a search space set in which DCI indicating a minimum offset value is transmitted.

Figure 9:
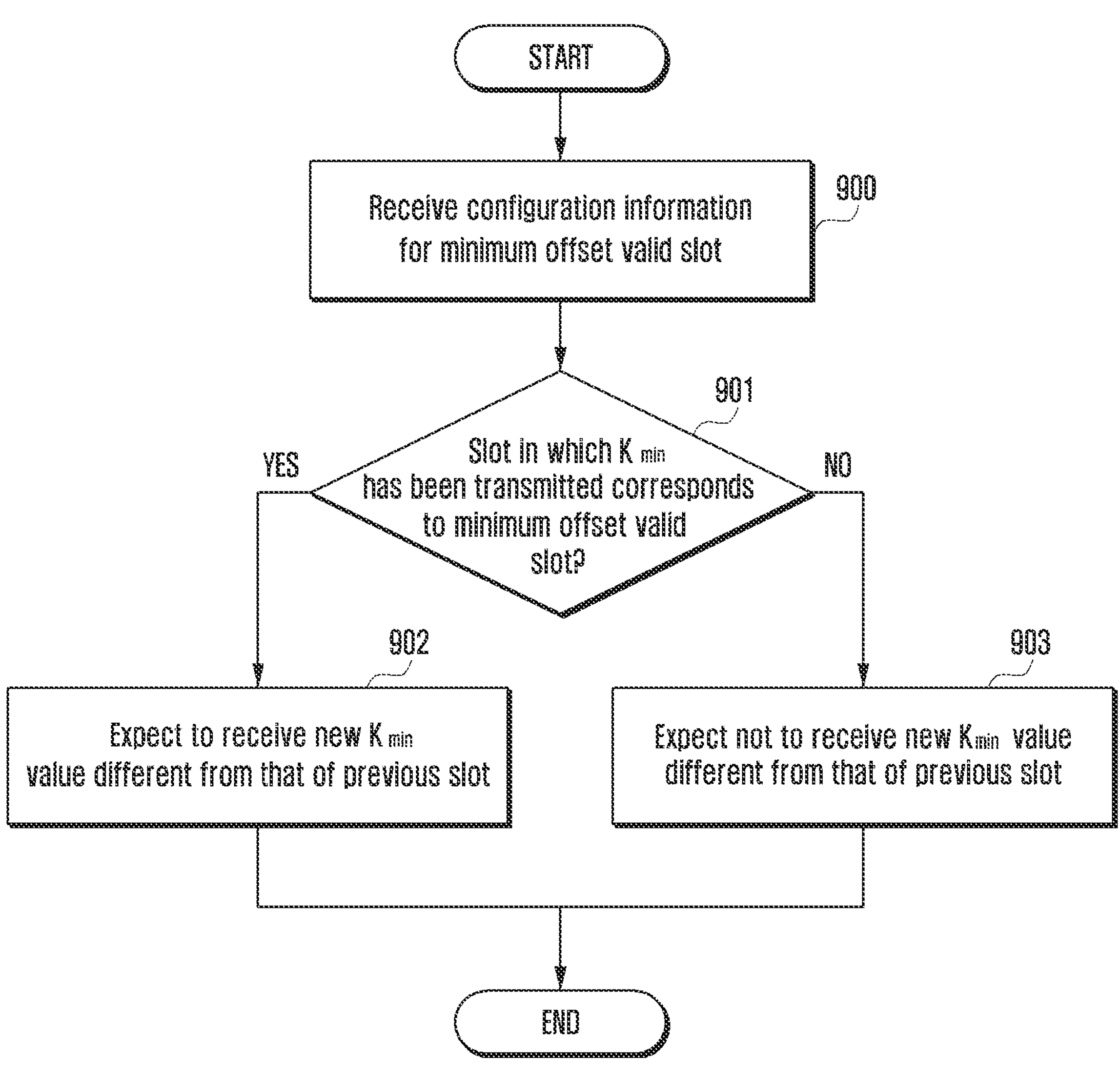
FIG. 9 is a diagram illustrating an example of a terminal operation according to an embodiment of the disclosure.

FIG. 9 is a diagram illustrating a terminal operation according to the 1-1th embodiment of the disclosure. A terminal may receive configuration information on a minimum offset valid slot in operation 900. The terminal may determine in operation 901 whether a slot in which $K_{min}$ is transmitted corresponds to the minimum offset valid slot. If the slot is determined to correspond to the minimum offset valid slot in operation 901, the terminal may expect that the received $K_{min}$ value is indicated as the same value as that for a previous slot or as a different new value. If the slot is determined not to correspond to the minimum offset valid slot in operation 901, the terminal may expect that the received $K_{min}$ value is indicated as the same value as that for a previous slot and may not expect that the received $K_{min}$ value is indicated as a different new value.

By restricting a time point, at which a new minimum offset value may be transmitted, via the aforementioned 1-1th embodiment, frequent changes of a minimum offset value of the terminal may be prevented so as to solve the aforementioned problems and significantly reduce power consumption of the terminal.

1-1-1th Embodiment

According to some embodiments of the disclosure, the terminal may pre-configured with a time point, at which an update to a new minimum offset value may be performed, by the base station via higher layer signaling. As an example, the base station may configure, to the terminal via higher layer signaling, information on a set of slot indices (or indices for a possible time resource unit, such as a symbol, a frame, a system frame, a PDCCH monitoring occasion index, etc.) enabling indication of a new minimum offset value. The aforementioned slot index is referred to as "minimum offset applicable slot".

A specific embodiment and a configuration method may be applied all in the same manner by substituting "minimum offset valid slot" with "minimum offset applicable slot" in the aforementioned 1-1th embodiment. If a slot at a time point, to which the received $K_{min}$ value is to be applied, is configured to a "minimum offset applicable slot", the terminal may update a minimum offset value to the received $K_{min}$ value, and if a slot at a time point, to which the received $K_{min}$ value is to be applied, is not configured to a "minimum offset applicable slot", the terminal may not update the minimum offset value to the received $K_{min}$ value, and may maintain, as it is, a previous minimum offset value (or a currently assumed minimum offset value) or may assume the minimum offset value to be a predefined default value. The default value may be regarded as, for example, $K_{min}$=0 or an operation that does not consider any restrictions on a time domain resource allocation table (that is, assuming that all entries in the preconfigured time domain resource allocation table are valid entries).

Figure 10:
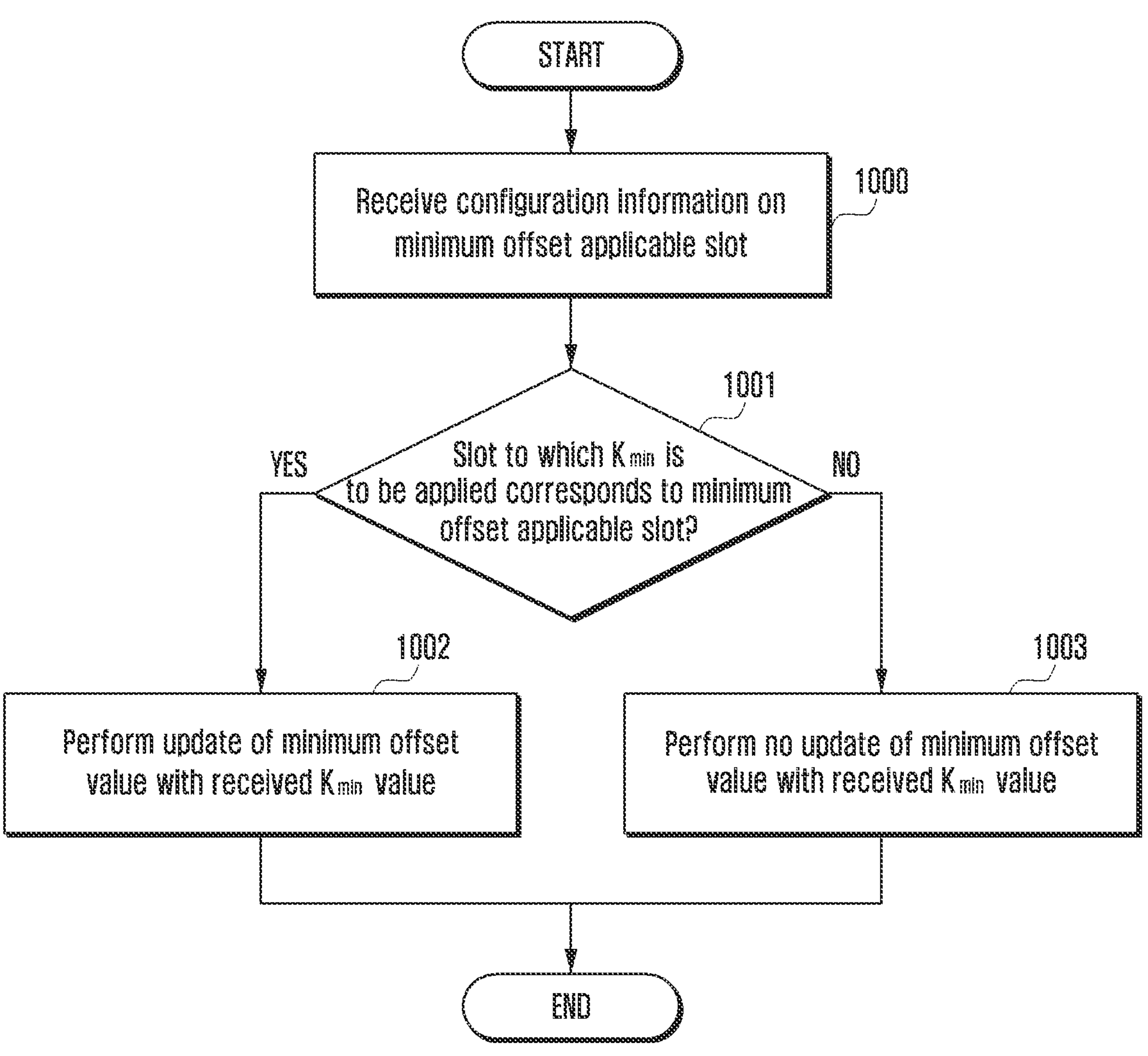
FIG. 10 is a diagram illustrating an example of a terminal operation according to another embodiment of the disclosure.

FIG. 10 is a diagram illustrating a terminal operation according to the 1-1-1th embodiment of the disclosure. A terminal may receive configuration information on a minimum offset applicable slot in operation 1000. The terminal may determine in operation 1001 whether a slot to which received $K_{min}$ is to be applied corresponds to a minimum offset applicable slot. If the slot is determined to correspond to the minimum offset applicable slot in operation 1001, the terminal may update a minimum offset value with the received $K_{min}$ value. If the slot is determined not to correspond to the minimum offset applicable slot in operation 1001, the terminal may not update a minimum offset value with the received $K_{min}$ value, and may maintain, as it is, a previously assumed minimum offset value or may assume the minimum offset value to be a predefined default value.

By restricting time point, to which a new minimum offset value is applicable, via the aforementioned 1-1-1th embodiment, frequent changes of a minimum offset value of the terminal may be prevented so as to solve the aforementioned problems and significantly reduce power consumption of the terminal.

1-1-2th Embodiment

The aforementioned 1-1th and 1-1-1th embodiments may be combined and applied. That is, the terminal may be configured with both a "minimum offset valid slot" and a "minimum offset applicable slot" by the base station via higher layer signaling, and therefore the aforementioned methods may be equally applied to respective slots.

1-2th Embodiment

According to some embodiments of the disclosure, by adjusting a monitoring occasion of a search space set configured for monitoring of a DCI format indicating a minimum offset value, a time point at which the minimum offset value may be transmitted may be limited (e.g., for prevention of a new minimum offset value from being transmitted within an application delay), and therefore frequent changes of the minimum offset value may be limited.

According to some embodiments of the disclosure, for a search space set configured for monitoring of a DCI format including a field for a minimum offset value, the terminal may expect neither a monitoring period to be configured to a value smaller than T, nor monitoring to be performed with a period smaller than T.

According to some embodiments of the disclosure, for the search space set configured for monitoring of a DCI format including a field for a minimum offset value, the terminal may expect a monitoring period to be configured to a value larger than T, or monitoring to be performed with a period greater than T.

According to some embodiments of the disclosure, for the search space set configured for monitoring of a DCI format including a field for a minimum offset value, the terminal may expect a monitoring period to be configured to T or monitoring to be performed with period T.

In this case, the T may be determined in the following methods.

- Method 1: T may be predefined as a part of system parameters.
- Method 2: T may correspond to a value reported to the base station through capability (signaling) of the terminal.
- Method 3: T may be configured for the terminal by the base station via higher layer signaling.
- Method 4: T may be determined by other system parameters configured for the terminal by the base station. For example, T may correspond to a smallest value (or a largest value) among minimum offset candidate values configured for the terminal, for example, $K_{min}(0)$, $K_{min}(1)$, . . . , $K_{min}(N-1)$.
- Method 5: T may be determined by other system parameters configured for the terminal by the base station. For example, T may correspond to a largest value (or a smallest value) among application delays that may be assumed by the terminal.
- Method 6: T may be determined by a system parameter that is indicated to the terminal by the base station. For example, T may correspond to a minimum offset value (or application delay) currently assumed by the terminal. That is, a monitoring period or a monitoring occasion of a search space set configured for monitoring of a DCI format indicating a minimum offset value may be changed based on a currently assumed (or indicated) minimum offset value (or application delay).

By restricting a time point, to which a new minimum offset value is applicable, via the aforementioned 1-2th embodiment, frequent changes of a minimum offset value of the terminal may be prevented so as to solve the aforementioned problems and significantly reduce power consumption of the terminal.

1-2-1th Embodiment

According to some embodiments of the disclosure, the terminal may be configured with a single search space set or multiple search space sets configured for monitoring of a DCI format indicating a minimum offset value. For example, for minimum offset candidate values $K_{min}(X)$, search space set #X may be configured. If a currently assumed minimum offset value is $K_{min}(X)$, the terminal may monitor search space set #X. The terminal may receive a DCI format indicating a minimum offset value from search space set #X.

Figure 11:
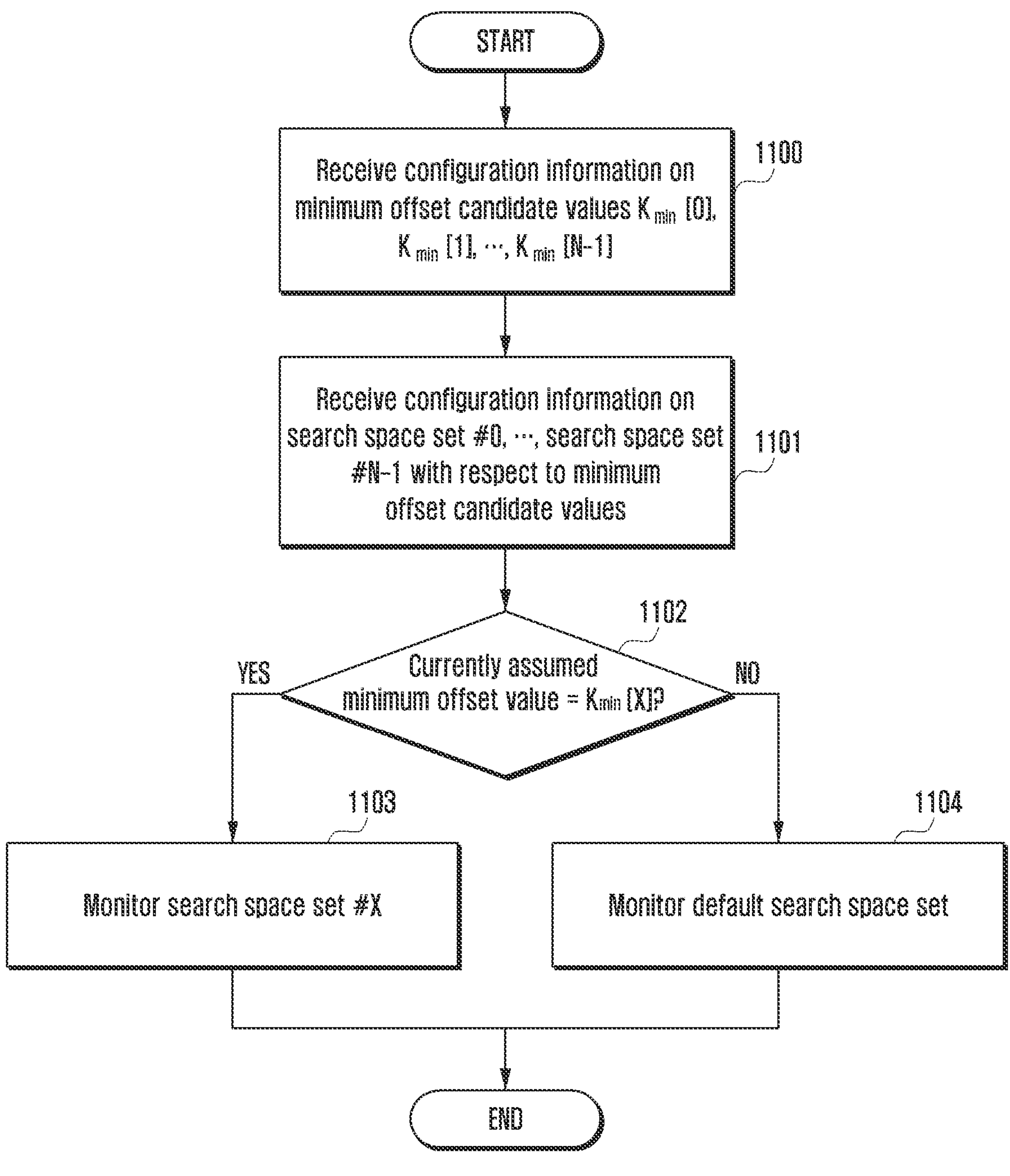
FIG. 11 is a diagram illustrating an example of a terminal operation according to another embodiment of the disclosure.

FIG. 11 is a diagram illustrating a terminal operation according to the 1-2-1th embodiment of the disclosure. A terminal may receive configuration information on minimum offset candidate values of $K_{min}(0)$, $K_{min}(1)$, . . . , $K_{min}(N-1)$ in operation 11100. The terminal may receive configuration information on each of search space sets, search space set #0, . . . , search space set #N−1, for the minimum offset candidate values in operation 1101. The terminal may determine whether a currently assumed minimum offset value is $K_{min}(X)$ in operation 1102. If the currently assumed minimum offset value is determined to be $K_{min}(X)$ in operation 1102, the terminal may, in operation 1103, monitor search space set #X corresponding to a corresponding minimum offset value and receive a $K_{min}$ value from search space set #X. If the currently assumed minimum offset value does not correspond to any of configured minimum offset values in operation 1102, the terminal may monitor a default search space set in operation 1104 (here, the default search space set may correspond to a search space set additionally configured for monitoring of DCI including a $K_{min}$ indicator regardless of the currently assumed minimum offset value).

Second Embodiment

According to some embodiments of the disclosure, the terminal may allow a new minimum offset value to be indicated from a PDCCH transmitted during a time interval corresponding to an application delay. When described in detail with reference to FIG. 7, the terminal may receive, in 700, new minimum offset value $K_{min,1}$ in slot n 710 and may apply received $K_{min,1}$ in slot n+3 713 which is a time point after the application delay 720. In this case, the terminal may allow another minimum offset value ($K_{min}$) having a value different from $K_{min,1}$ to be indicated from DCI transmitted in PDCCH monitoring occasions (705 and 706 in an example of FIG. 7) existing during the application delay 720 for received $K_{min,1}$.

That is, according to the second embodiment, when a new minimum offset value is received from a PDCCH transmitted during a time interval corresponding to an application delay, the terminal may apply a minimum offset by determining whether to apply an existing minimum offset ($K_{min,1}$) or to apply the new minimum offset value ($K_{min,2}$), without ignoring the new minimum offset value.

According to the second embodiment of the disclosure, the terminal may update the minimum offset value with the $K_{min}$ value indicated from a most recently received DCI.

According to the second embodiment of the disclosure, with respect to application delays for the $K_{min}$ value indicated from DCI received within the application delay, the terminal may apply different application delays according to time points at which the corresponding DCI is received. More specifically, the application delay assumed by the terminal for the minimum offset is expressed as $T_{delay,0}$ (for example, this may correspond to an application delay that is expressible by a function, such as Equation 3, or a function similar thereto). The terminal may assume the application delay $T_{delay,0}$ based on a specific time point among time points for monitoring of a DCI format indicating the minimum offset value. A first slot, in which the terminal assumes application delay $T_{delay,0}$, is referred to as "slot A". For example, slot n 710 in FIG. 7 may correspond to slot A. The terminal may apply $K_{min}(k_{min,1})$ indicated via a DCI format transmitted in slot A, from a time point after $T_{delay,0}$. For example, in FIG. 7, in slot n+3 713, $K_{min}(k_{min,1})$ indicated in slot n 710 may be applied. The terminal may receive the DCI format from the PDCCH existing in a time interval corresponding to $T_{delay,0}$ after slot n 710, and $K_{min}$ may be indicated therefrom. For example, in FIG. 7, a DCI format indicating minimum offset value $K_{min}(k_{min,2})$ may be additionally received from the PDCCH for the PDCCH monitoring occasions 705 and 706 existing within the application delay 720. After slot A, the terminal may apply application delay $T_{delay,1}(k)$ different from $T_{delay,0}$ with respect to the application delay for the $K_{min}$ value indicated in the DCI format transmitted within the application delay. $T_{delay,1}(k)$ may be expressed by a function of $T_{delay,0}$ and a slot index (or a slot location, an offset from slot A, or the like) in which $K_{min}$ is indicated within the application time. For example, the terminal may assume an application delay shorter than $T_{delay,0}$ for the $K_{min}$ value indicated within the application delay after slot A. For a specific example, if slot n corresponds to the aforementioned slot A, and a slot in which the terminal has received $K_{min}$ within the application delay is slot n+k, $T_{delay,1}(k)=\max(T_{delay,0}-k, T_{delay,min})$ may be defined. Here, $T_{delay,min}$ may be defined as a possible minimum value for an application delay. That is, in an example of FIG. 7, if slot n 710 corresponds to slot A, and $T_{delay,0}=3$ is satisfied, application delay $T_{delay,1}(1)=3-1=2$ may be applied to $K_{min}$ received in slot n+1 711, and application delay $T_{delay,1}(2)=3-2=1$ may be applied to $K_{min}$ received in slot n+2 712. If application delay adjustment according to the aforementioned embodiment is applied, the terminal may guarantee the same application time points for one or multiple $K_{min}$ values received within an application delay. In an example of FIG. 7, the terminal may apply, in slot n+3 713, all $K_{min}$ values received in slot n 710, slot n+1 711, and slot n+2 712. Via the embodiment, a problem of frequent changes in a minimum offset value that the terminal assumes can be solved.

According to the second embodiment of the disclosure, if the terminal has received multiple minimum offset values, for example, $K_{min}(0)$, $K_{min}(1)$, . . . , $K_{min}(N-1)$, and all the received minimum offset values need to be applied in the same slot X, the terminal may update a minimum offset value to a $K_{min}$ value indicated from a most recently received DCI format from among the received minimum offset values.

Third Embodiment

In some embodiments of the disclosure, the terminal may not monitor a PDCCH during a time interval corresponding to an application delay for the purpose of maximally reducing power consumption due to PDCCH monitoring. That is, during a time interval corresponding to an application delay, if there exists a PDCCH monitoring occasion configured for monitoring from the base station, the terminal may not perform monitoring for the PDCCCH monitoring occasion. When described in detail by taking FIG. 7 as an example, the terminal may receive $K_{min,1}$ via DCI transmitted in the PDCCH monitoring occasion 704 of slot n 710 (operation 700). The terminal may apply $K_{min,1}$ in a slot (slot n+3 713 in FIG. 7) after the application delay 720 with respect to $K_{min}$ received in the PDCCH monitoring occasion 704 (operation 701). The terminal may not perform monitoring for the PDCCH monitoring occasions 705 and 706 existing in other slots (slot n+1 711 and slot n+2 712) within the application delay corresponding to 720. The terminal may perform monitoring again for a PDCCH monitoring occasion 707 of a slot (slot n+3 713) that exists after the application delay 720.

As described above, the terminal may not perform PDCCH monitoring for a specific time period (the application delay in the above example). Hereinafter, for brevity in describing the disclosure, operations of not performing PDCCH monitoring are collectively referred to as "PDCCH skip operation", and time intervals in which the terminal may apply a PDCCH skip operation are collectively referred to as "first time interval". For example, the aforementioned application delay may correspond to a first time interval.

When considering a PDCCH skip operation in a first time interval of the terminal described above, if the terminal performs the PDCCH skip operation in a state where the understanding of the first time interval is different between the base station and the terminal, proper transmission and reception between the base station and the terminal may not be possible. For example, in FIG. 8, the base station may assume the first time interval to be slot 1 811, and the terminal may assume the first time interval to be slot 2 812.

In this case, the base station may transmit a PDCCH in a PDCCH monitoring occasion 803 of slot 2 812, while the terminal may not monitor the PDCCH monitoring occasion 803. Therefore, it may be important to ensure the same understanding of the first time interval between the base station and the terminal.

According to an embodiment of the disclosure, the first time interval may be configured by the following information.

First time interval-related parameters

First time point for assumption of a first time interval (e.g., a start slot)

Length of a first time interval

Repetition period of a first time interval

According to an embodiment of the disclosure, the terminal may be pre-configured with a first time interval from the base station via higher layer signaling (or the first time interval may correspond to a time point at which the terminal applies (or assumes) an application delay for the first time, a time point at which the terminal applies (or assumes) an application delay, a time interval to which a PDCCH skip operation may be applied, a time interval in which an operation may be performed in consideration of a PDCCH skip operation, or the like). In a method of configuring a first time interval, for example, all of some of the "first time interval-related parameters" may be notified of from the base station via higher layer signaling. As another example, in a method of configuring a first time interval, the "minimum offset valid slot" in the aforementioned 1-1th embodiment may all be substituted with a "PDCCH skip operation disabled slot" so as to be equally applied.

According to an embodiment of the disclosure, all or some of the "first time interval-related parameters" may be determined by a system parameter which is currently assumed or is configured for the terminal. For example, the following methods may be considered for a method of determining a first time interval. In the following description, a search space set configured for the terminal to monitor a DCI format indicating a minimum offset value is referred to as "search space set A".

Method 1: The terminal may determine a first time interval from a PDCCH monitoring occasion determined based on search space set A. For example, the terminal may assume, as a first time interval, a time interval remaining after excluding a slot in which the PDCCH monitoring occasion determined based on search space set A exists. As another example, the terminal may determine, as a first time interval, a time interval corresponding to a specific time length (this is referred to as "time interval T". "Time interval T" may be, for example, a time length corresponding to an application delay or a minimum offset value that the terminal currently assumes), starting with a slot (this is referred to as "slot A") subsequent to a specific slot from among slots in which the PDCCH monitoring occasion determined based on search space set A exists. Therefore, the terminal may determine, as the entire first time interval, a time interval repeated every time interval T+1 starting with slot A. Here, slot A may be configured for the terminal by the base station via higher layer signaling or may correspond to a fixed slot (e.g., slot 0 or a first PDCCH monitoring occasion corresponding to search space set A).

Method 2: The terminal may assume, as a start point, a slot (this is referred to as slot A) subsequent to a slot, in which the PDCCH monitoring occasion corresponding to search space set A exists, existing at a time point closest to a time point corresponding to after a specific time (for example, after X ms, e.g., X=3) after transmission of HARQ-ACK for a PDSCH scheduled by a DCI format indicating a minimum offset value. Starting with slot A, a time interval corresponding to a specific time length (this is referred to as "time interval T". "Time interval T" may be, for example, a time length corresponding to an application delay or a minimum offset value that the terminal currently assumes) may be determined as a first time interval. Therefore, the terminal may determine, as the entire first time interval, a time interval repeated every time interval T+1 starting with slot A. Here, slot A may be configured for the terminal by the base station via higher layer signaling or may correspond to a fixed slot (e.g., slot 0 or a first PDCCH monitoring occasion corresponding to search space set A).

Method 3: In some embodiments of the disclosure, a time interval remaining after excluding a slot corresponding to the aforementioned "minimum offset valid slot" may correspond to a first time interval.

Method 4: In some embodiments of the disclosure, a time interval remaining after excluding a slot corresponding to the aforementioned "minimum offset applicable slot" may correspond to a first time interval.

Method 5: A first time interval may be determined by a method corresponding to a combination of all or some of the aforementioned methods.

According to an embodiment of the disclosure, a first time interval may vary according to an application delay or a minimum offset value that the terminal currently assumes.

In some embodiments of the disclosure, the terminal may perform a "PDCCH skip operation" for PDCCH monitoring occasions corresponding to all search space sets configured in the aforementioned first time interval.

Figure 12A:
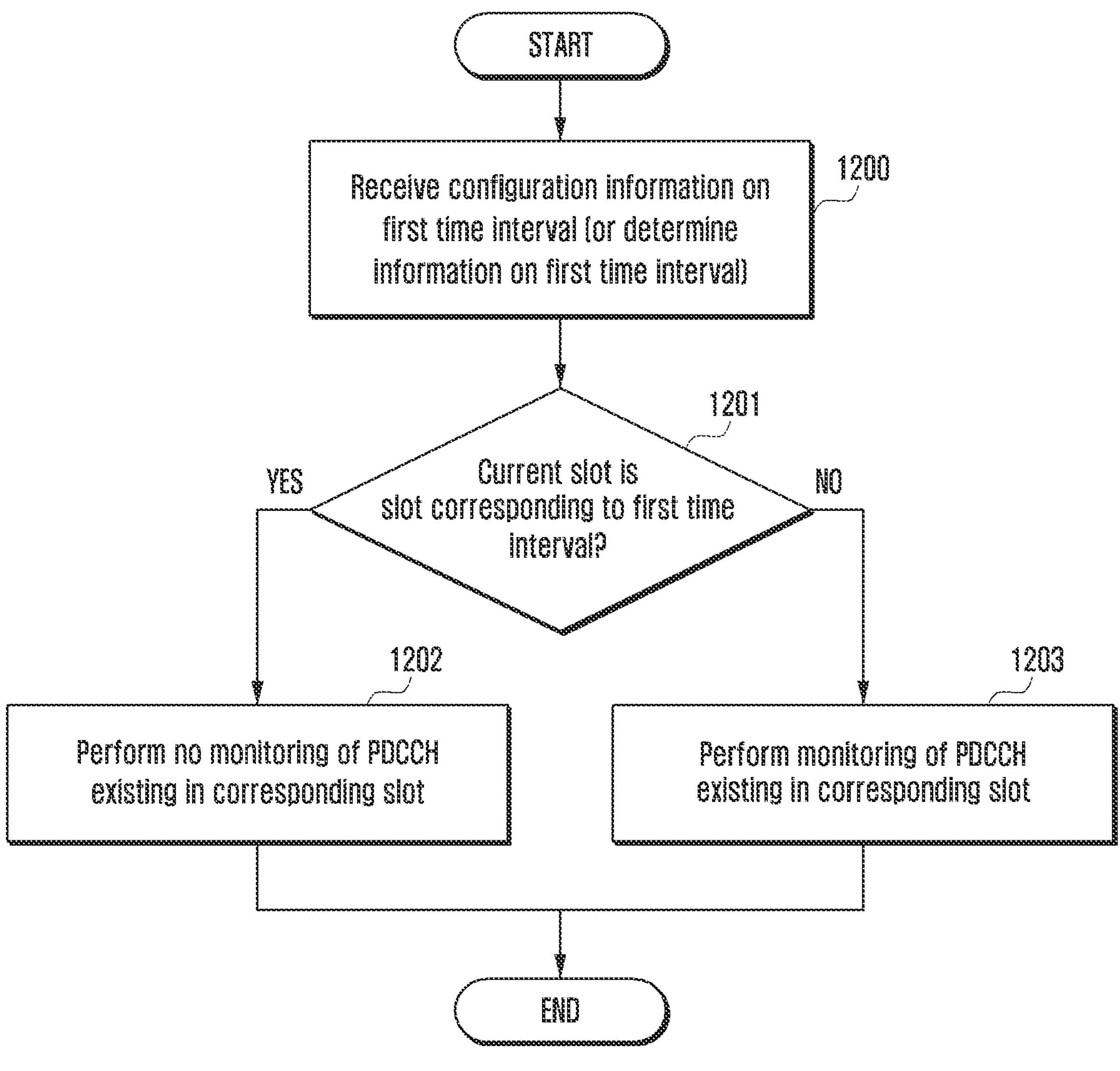
FIG. 12A is a diagram illustrating an example of a terminal operation according to another embodiment of the disclosure.

FIG. 12A is a diagram illustrating a terminal operation according to the embodiments of the disclosure. In operation 1200, a terminal may receive configuration information on a first time interval or may determine a first time interval via the aforementioned various methods. The terminal may determine in operation 1201 whether a current slot is a slot corresponding to the first time interval. If the slot is determined to correspond to the first time interval in operation 1201, the terminal may not perform monitoring for a PDCCH existing in the slot in operation 1202 (that is, a "PDCCH skip operation" may be performed). If the slot is determined not to correspond to the first time interval in operation 1201, the terminal may perform monitoring for the PDCCH existing in the slot in operation 1203.

In some embodiments of the disclosure, the terminal may perform the "PDCCH skip operation" for PDCCH monitoring occasions corresponding to all or some search space sets configured in the aforementioned first time interval. For example, the terminal may selectively perform a "PDCCH skip operation" only for PDCCH monitoring occasions corresponding to the following search space sets.

A PDCCH monitoring occasion determined based on a search space set configured for monitoring of a DCI format including a field indicating a minimum offset value ($K_{min}$) value A PDCCH monitoring occasion determined based on a search space set the type of which is configured to be a UE-specific search space Search space sets to which the PDCCH skip operation is applied are collectively referred to as "first search space set".

For example, the terminal may still monitor PDCCH monitoring occasions corresponding to the following search space sets.

A PDCCH monitoring occasion determined based on a search space set the type of which is configured to be a common search space A PDCCH monitoring occasion determined based on a search space set configured for monitoring of a DCI format (e.g., DCI format 2_0) indicating a slot format A PDCCH monitoring occasion determined based on a search space set configured for monitoring of a DCI format (e.g., DCI format 2_1) indicating pre-emption.

A PDCCH monitoring occasion determined based on a search space set configured for monitoring of a DCI format (e.g., DCI formats 2_2 and 2_3) indicating a transmission power command The search space sets to which the PDCCH skip operation is not applied are collectively referred to as "first search space set".

FIG. 12B is a diagram illustrating a terminal operation according to the embodiments of the disclosure. In operation 1204, a terminal may receive configuration information on a first time interval or may determine a first time interval via the aforementioned various methods. The terminal may determine in operation 1205 whether a current slot is a slot corresponding to the first time interval. If the slot is determined to correspond to the first time interval in operation 1205, the terminal may determine whether a PDCCH monitoring occasion existing in the slot corresponds to a "first search space set" in operation 1206. If the PDCCH monitoring occasion is determined to correspond to the first search space set in operation 1206, the terminal may not perform monitoring for the PDCCH monitoring occasion existing in the slot in operation 1207. If the PDCCH monitoring occasion is determined not to correspond to the first search space set in operation 1206, the terminal may perform monitoring for the PDCCH monitoring occasion existing in the slot in operation 1207. If the slot is determined not to correspond to the first time interval in operation 1205, the terminal may perform monitoring for the PDCCH existing in the slot in operation 1209.

In a method of performing monitoring, by the terminal, for PDCCH monitoring occasions existing the first time interval according to some embodiments of the disclosure, with respect to a PDCCH monitoring occasion corresponding to both the "first search space set" and a "second search space set" among the PDCCH monitoring occasions existing in the first time interval, the terminal may perform monitoring for the corresponding PDCCH monitoring occasion. That is, if the PDCCH monitoring occasion corresponding to the first search space set and the PDCCH monitoring occasion corresponding to the second search space set overlap, the terminal may perform monitoring the corresponding PDCCH monitoring occasion.

In some embodiments of the disclosure, in the method of performing monitoring, by the terminal, for PDCCH monitoring occasions existing the first time interval, with respect to a PDCCH monitoring occasion corresponding to both the "first search space set" and the "second search space set" among the PDCCH monitoring occasions existing in the first time interval, the terminal may not perform monitoring for the corresponding PDCCH monitoring occasion. That is, the PDCCH monitoring occasion corresponding to the first search space set and the PDCCH monitoring occasion corresponding to the second search space set overlap, the terminal may not perform monitoring for the corresponding PDCCH monitoring occasion.

In some embodiments of the disclosure, the base station may configure, for the terminal via higher layer signaling, or indicate, to the terminal via L1 signaling, whether to perform a PDCCH skip operation in the first time interval.

In the aforementioned embodiment, a slot index may be substituted with an index having a different time unit, for example, a symbol index, a frame index, or a system frame index, so as to be applied in the same manner.

In the aforementioned embodiment, the slot index may be substituted with an index related to PDCCH monitoring, for example, a PDCCH monitoring occasion index, so as to be applied in the same manner. For example, the PDCCH monitoring occasion index may correspond to a PDCCH monitoring occasion index for determination of a search space set in which DCI indicating a minimum offset value is transmitted.

Fourth Embodiment

In some embodiments of the disclosure, the terminal may be configured with one or multiple cells from the base station, and may be configured or indicated with different minimum offset values for respective cells (or equally for respective bandwidth parts). The terminal may assume or apply the same minimum offset value with respect to a specific cell group or cell set among configured cells. The aforementioned cell set, for which the same minimum offset value is assumed or applied, is referred to as "first cell group". The first cell group may be determined by, for example, one of or a combination of one or more of the following cases.

A set of cells existing in the same frequency range (FR) (for example, the frequency range may be divided into FR1 and FR1 according to a carrier frequency, and the terminal may assume or apply the same minimum offset value for cells existing in FR1, and may assume or apply the same minimum offset value for cells existing in FR2.)

A set of cells existing in the same frequency layer (FL)

A set of cells existing in the same cell group (for example, the cell group may be divided into a master cell group (MCG) or a secondary cell group, and the terminal may assume or apply the same minimum offset value for cells existing in the MCG, and may assume or apply the same minimum offset value for cells existing in the SCG.)

A set of cells corresponding to intra-band CA (for example, the terminal may assume or apply the same minimum offset value for cells corresponding to the intra-band CA)

A set of cells configured with cross-carrier scheduling (for example, cell #0 among cells #0, cell #1, . . . , cell #N−1 may be configured with self-carrier scheduling, and cell #1, . . . , cell #N−1 may be configured with cross-carrier scheduling. In this case, the same minimum offset value may be assumed or applied for cell #0, cell #1, . . . , cell #N−1, for which cell #0 performs scheduling.)

In some embodiments of the disclosure, in a method enabling assumption or application of the same minimum offset value for cells existing in the first cell group, at least one of or a combination of one or more of the following methods may be applied.

Method 1: With respect to cell i (i=0, 1, . . . , N−1) existing in the first cell group, the terminal may be configured or indicated with $K_{min}(i)$ (i=0, 1, . . . , N−1), and the terminal may assume a minimum offset by using a $K_{min}$ value corresponding to a minimum value (or maximum value) among multiple notified $K_{min}(i)$ (i=0, 1, . . . , N−1) values.

Method 2: With respect to cell i (i=0, 1, . . . , N−1) existing in the first cell group, the terminal may be configured or indicated with $K_{min}(i)$ (i=0, 1, . . . , N−1), wherein the terminal may not expect that multiple $K_{min}(i)$ (i=0, 1, . . . , N−1) values are configured or indicated with different values.

Method 3: The terminal may be configured or indicated with $K_{min}$ from cell X serving as a reference from among cell i (i=0, 1, . . . , N−1) existing in the first cell group, and this may be applied to all cells existing in the first cell group in the same manner. Cell X may be determined to be, for example, a cell having a lowest (or highest) index among cells, a PCell, or a PSCell, a cell performing scheduling, or the like.

In the aforementioned fourth embodiment, if operating in carrier aggregation (CA), the terminal may apply the same minimum offset value to all cells in the first cell group, and accordingly, the terminal may operate in a power reduction mode concurrently for all cells in the first cell group, thereby more effectively reducing power consumption of the terminal.

Fifth Embodiment

In some embodiments of the disclosure, the terminal may be configured with one or multiple cells from the base station, and may be configured or indicated with different minimum offset values for respective cells (or equally for respective bandwidth parts). The terminal may assume or apply the same application delay with respect to a specific cell group or cell set among configured cells. The aforementioned cell set, for which the same application delay is assumed or applied, is referred to as "first cell group". The first cell group may be determined by, for example, at least one of or a combination of one or more of the following cases.

A set of cells existing in the same frequency range (FR) (for example, the frequency range may be divided into FR1 and FR1 according to a carrier frequency, and the terminal may assume or apply the same minimum offset value for cells existing in FR1, and may assume or apply the same application delay for cells existing in FR2.)

A set of cells existing in the same frequency layer (FL)

A set of cells existing in the same cell group (for example, the cell group may be divided into a master cell group (MCG) or a secondary cell group, and the terminal may assume or apply the same minimum offset value for cells existing in the MCG, and may assume or apply the same minimum offset value for cells existing in the SCG.)

A set of cells corresponding to intra-band CA (for example, the terminal may assume or apply the same minimum offset value for cells corresponding to the intra-band CA)

A set of cells configured with cross-carrier scheduling (for example, cell #0 among cells #0, cell #1, . . . , cell #N−1 may be configured with self-carrier scheduling, and cell #1, . . . , cell #N−1 may be configured with cross-carrier scheduling. In this case, the same application delay may be assumed or applied for cell #0, cell #1, . . . , cell #N−1, for which cell #0 performs scheduling.)

In some embodiments of the disclosure, in a method enabling assumption or application of the same application delay value for cells existing in the first cell group, at least one of or a combination of one or more of the following methods may be applied.

Method 1: With respect to cell i (i=0, 1, . . . , N−1) existing in the first cell group, the terminal may be configured or indicated with $K_{min}(i)$ (i=0, 1, . . . , N−1), and the terminal may determine an application delay by using a function of a $K_{min}$ value corresponding to a minimum value (or maximum value) among multiple notified $K_{min}(i)$ (i=0, 1, . . . , N−1) values. For example, the determination may be made according to the following equations.

When a minimum value is used,

Equation 4

$$T_{app} = \text{ceil}(T_0 + T_{delay}) * S \text{ where } T_{delay} = \max(K_{min,pre}, T_{delay,min})$$
$$K_{min,pre} = \min(K_{min,pre}(0), K_{min,pre}(1), \ldots, K_{min,pre}(N-1))$$

When a maximum value is used,

Equation 5

$$T_{app} = \text{ceil}(T_0 + T_{delay}) * S \text{ where } T_{delay} = \max(K_{min,pre}, T_{delay,min})$$
$$K_{min,pre} = \max(K_{min,pre}(0), K_{min,pre}(1), \ldots, K_{min,pre}(N-1))$$

$K_{min,pre}(i)$ may correspond to a minimum offset value currently assumed in cell i, and if a PDCCH and a PDSCH have different numerologies, scaling may be applied based on the numerology of a control channel in consideration of a ratio of a subcarrier spacing of the control channel to a subcarrier spacing of a data channel. For example, determination may be made so that $K_{min,pre}(i)=K_{min,pre}(i)*S2$, where $S2=2^{(\mu\_control\text{-}\mu\_data)}$. For example, if the first cell group corresponds to a set of cells configured with cross-carrier scheduling, an application delay may be determined as follows.

For same-carrier scheduling case and for the active DL BWP and the active UL BWP, when UE is indicated in slot n to change the minimum applicable values of K0 and/or K2, UE is not expected to apply the new indicated minimum applicable values earlier than slot $\lceil (n + X) \cdot 2^{\mu PDSCH} / 2^{\mu PDCCH} \rceil$ for K0 and/or slot $\lceil (n + X) \cdot 2^{\mu PUSCH} / 2^{\mu PDCCH} \rceil$ for K2, where

- X = max(Y, Z)
- Y is the minimum applicable K0 value prior to the indicated change
- Z, presenting the smallest feasible non-zero application delay, is (1, 1, 2, 2) for DL SCS of (15, 30, 60, 120) KHz, respectively
- FFS: Upper bound on application delay -continued The case of cross-carrier scheduling, focusing on the determination of Y value

- Note: Determination of Y value requires support for potential conversion of the minimum K0 from the PDSCH numerology to the PDCCH numerology:
  - $Y = \min_i(W(i), 0 \le i \le N-1)$
  - $W(i) = \lceil K0_{min}(i) \cdot 2^{\mu control} / 2^{\mu data} \rceil$
  - $K0_{min}(i)$ is the minimum K0 in scheduled cell i Method 2: With respect to cell i (i=0, 1, . . . , N−1) existing in the first cell group, the terminal may be configured or indicated with $K_{min}(i)$ (i=0, 1, . . . , N−1), wherein the terminal may not expect that multiple $K_{min}(i)$ (i=0, 1, . . . , N−1) values are configured or indicated with different values.

Method 3: The terminal may be configured or indicated with $K_{min}$ from cell X serving as a reference from among cell i (i=0, 1, . . . , N−1) existing in the first cell group, and based on this value, the same application delay may be applied to all cells existing in the first cell group. Cell X may be determined to be, for example, a cell having a lowest (or highest) index among cells, a PCell, or a PSCell, a cell performing scheduling, or the like.

Method 4: With respect to cell i (i=0, 1, . . . , N−1) existing in the first cell group, the terminal may be configured or indicated with $K_{min}(i)$ (i=0, 1, . . . , N−1), and the terminal may determine an application delay of $T_{delay}(i)$ (i=0, 1, . . . , N−1) for each cell, based on multiple notified $K_{min}(i)$ (i=0, 1, . . . , N−1) values. The terminal may determine the application delay by using a value corresponding to a minimum value (or maximum value) among $T_{delay}(i)$ (i=0, 1, . . . , N−1) values.

Via the aforementioned fifth embodiment, if operating in carrier aggregation (CA), the terminal may apply the same application delay to all cells in the first cell group, and accordingly, the terminal may operate in the power reduction mode concurrently for all cells in the first cell group, thereby more effectively reducing power consumption of the terminal.

Sixth Embodiment

In an embodiment of the disclosure, the terminal may be configured with a time domain resource allocation table for each configured bandwidth part (BWP). For example, if two bandwidth parts, bandwidth part #1 and bandwidth part #2 are configured for the terminal, each of time domain resource allocation table #1 and time domain resource allocation table #2 may be configured for the terminal as configuration information in each bandwidth part. The terminal may use a time domain resource allocation table corresponding to a bandwidth part index indicated by a bandwidth part indicator in DCI. For example, if the bandwidth part indicator in the DCI indicates bandwidth part #N, the terminal may, when interpreting a time domain resource allocation table field in the DCI, perform interpretation by assumption of time domain resource allocation table #N configured as configuration information of bandwidth part #N.

The terminal may receive a minimum offset value from the base station via DCI transmitted in a currently active bandwidth part, and may limit a scheduling offset value in each bandwidth part, based on the received minimum offset value. That is, if bandwidth part A and bandwidth part B are configured for the terminal, time domain resource allocation table A is configured for bandwidth part A, time domain resource allocation table B is configured for bandwidth part B, and the currently active bandwidth part is bandwidth part A, the terminal may be indicated with a minimum offset value ($K_{min}$) from the base station via DCI transmitted in bandwidth part A. The terminal may determine, based on the $K_{min}$ value, a scheduling limit of currently active bandwidth part A as well as inactive bandwidth part B. That is, the terminal may not expect scheduling to be performed with a scheduling offset having a value smaller than $K_{min}$ in bandwidth part A (that is, it is not expected that the scheduling offset value of time domain resource allocation table A is indicated with a value smaller than $K_{min}$), and may not expect scheduling to be performed with a scheduling offset having a value smaller than $f(K_{min})$ in bandwidth part B (that is, it is not expected that the scheduling offset value of time domain table B is indicated with a value smaller than $f(K_{min})$). In this case, $f(K_{min})$ may correspond to any function using $K_{min}$ as a parameter. In the situation above, if a subcarrier spacing (or numerology) of currently active bandwidth part A and that of currently inactive bandwidth part B are different, $f(K_{min})$ may be determined in consideration of the subcarrier spacing of bandwidth part A (μ_A) and the subcarrier spacing of bandwidth part B (μ_B). As an example for determining $f(K_{min})$, the following methods may be considered.

Method 1

When the $K_{min}$ value received in active bandwidth part A is applied for a scheduling limit of inactive bandwidth part B, the $K_{min}$ value based on the subcarrier spacing of bandwidth part A may be applied as it is to bandwidth part B. For example, $f(K_{min})$ may be defined as follows.

$$f(K_{min}) = K_{min}$$

Method 2

When the $K_{min}$ value received in active bandwidth part A is applied for a scheduling limit of inactive bandwidth part B, the $K_{min}$ value may be reconverted and then applied based on the subcarrier spacing of bandwidth part B. For example, $f(K_{min})$ may be defined as follows.

$$f(K_{min}) = \text{floor}\left(K_{min} \cdot 2^{\mu\_B} / 2^{\mu\_A}\right) \text{ or}$$

$$f(K_{min}) = \text{ceil}\left(K_{min} \cdot 2^{\mu\_B} / 2^{\mu\_A}\right)$$

Method 3

When the $K_{min}$ value received in active bandwidth part A is applied for a scheduling limit of inactive bandwidth part B, the $K_{min}$ value may be reconverted and then applied to bandwidth part B, based on subcarrier spacing μ_R as a reference. In this case, μ_R may be defined as a smaller value among μ_A and μ_B, or may correspond to a value configured for the terminal via higher layer signaling. For example, $f(K_{min})$ may be defined as follows.

$$f(K_{min}) = \text{floor}(K_{min} \cdot 2^{\mu\_R}/2^{\mu\_A}) \text{ or}$$

$$f(K_{min}) = \text{ceil}(K_{min} \cdot 2^{\mu\_R}/2^{\mu\_A})$$

When the terminal receives the minimum offset value via DCI in slot n, the terminal may apply the received minimum offset value from n+X. As described above, X may be referred to as an application delay. In a method of determining application delay X, the subcarrier spacing (μ_A) of bandwidth part A, the subcarrier spacing (μ_B) of bandwidth part B, etc. may be considered as parameters. For example, the following methods may be considered.

Method 4

Application delay X may be determined based on a subcarrier spacing of active bandwidth part A. For example, X may be determined as follows.

$$X = \max(\text{floor}(K_{min,old} \cdot 2^{\mu 0}/2^{\mu 1}), Z)$$

In the above equation, $K_{min,old}$ may correspond to a minimum offset value that the terminal currently assumes, μ0 may correspond to a subcarrier spacing of a PDCCH, μ1 may correspond to a subcarrier spacing of a PDSCH, and Z may correspond to a minimum value of a predefined application delay.

Method 5

Application delay X may be determined by considering both subcarrier spacings of active bandwidth part A and inactive bandwidth part B. For example, the application delay may be calculated based on a smaller value among the subcarrier spacing (μ_A) of bandwidth part A and the subcarrier spacing (μ_B) of bandwidth part B. For example, X may be determined as follows.

$$X = \max(\text{floor}(K_{min,old} \cdot 2^{\mu 0}/2^{\mu 1}) \cdot 2^{\mu\_R}/2^{\mu\_A}, Z)$$

In the above equation, μ_R may be defined as a smaller value among μ_A and μ_B.

Method 6

Application delay X may be determined by considering both subcarrier spacings of active bandwidth part A and inactive bandwidth part B. For example, the minimum offset value may be reconverted based on the subcarrier spacing of bandwidth part B in consideration of a ratio of the subcarrier spacing of bandwidth part B to the subcarrier spacing of bandwidth part A, and application delay X for bandwidth part B may be determined based on the reconverted minimum offset value. For example, X may be determined as follows.

$$X = \max(\text{floor}(K_{min,old} \cdot 2^{\mu\_B}/2^{\mu\_A} \cdot 2^{\mu 0}/2^{\mu 1}), Z_{\mu\_B}), \text{ or}$$

$$X = \max(\text{floor}(f(K_{min,old}) \cdot 2^{\mu 0}/2^{\mu 1}), Z_{\mu\_B})$$

In the above equation, $K_{min,old}$ may correspond to a minimum offset value that the terminal assumes for bandwidth part A, $f(K_{min,old})$ may correspond to a minimum offset value that the terminal assumes for bandwidth part B or a minimum offset value reconverted by considering a ratio of subcarrier spacings between bandwidth part A and bandwidth part B, and $Z_\mu$ may correspond to a minimum value of an application delay defined in response to subcarrier spacing parameter μ. A method of determining $f(K_{min,old})$ may follow aforementioned methods 1, 2, 3, and the like.

In the aforementioned sixth embodiment, a case of scheduling (Same-BWP scheduling) in the same bandwidth part, that is, a case of scheduling from bandwidth part A to bandwidth part A corresponds to μ_B=μ_A.

If the terminal receives, via DCI in slot n, an indicator for activation of inactive bandwidth part B, the terminal may activate bandwidth part B at a time point no later than slot n+$T_{BWP}$. $T_{BWP}$ may be defined as a bandwidth part change delay time (see the aforementioned descriptions of bandwidth parts and the contents of Table 2-1). The terminal may monitor a PDCCH in currently active bandwidth part A, and may receive DCI including scheduling information on inactive bandwidth part B through the PDCCH.

In an embodiment of the disclosure, in consideration of a bandwidth part delay time ($T_{BWP}$) for activation of bandwidth part B of the terminal, the base station may not perform scheduling for a time point within the bandwidth part change delay time when bandwidth part B is scheduled. Also, the terminal may not expect a scheduling offset value to be indicated with a value smaller than the bandwidth part change delay time. If the terminal receives a minimum offset value in currently active bandwidth part A, the terminal may assume a scheduling limit (not expecting the scheduling offset value to be indicated with a value smaller than a specific value) in consideration of a minimum offset value, an application delay, and a bandwidth part delay time with respect to scheduling for inactive bandwidth part B.

In an embodiment of the disclosure, the terminal may determine a scheduling limit for inactive bandwidth part B in consideration of both a minimum offset value ($K_{min}$) and a bandwidth part delay time ($T_{BWP}$). For example, the terminal may not expect the scheduling offset value to be indicated with a value smaller than $\max(g_1(K_{min}), T_{BWP})$ with respect to inactive bandwidth part B. In this case, $g_1(K_{min})$ may correspond to any function using $K_{min}$ as a parameter. According to an embodiment, $g_1(K_{min})$ may be defined based on any method including the method of converting a minimum offset value for bandwidth part B, described in method 1, method 2, and method 3 of the aforementioned sixth embodiment.

In an embodiment of the disclosure, the terminal may determine a scheduling limit for inactive bandwidth part B in consideration of both an application delay (X) and a bandwidth part delay time ($T_{BWP}$). For example, the terminal may not expect the scheduling offset value to be indicated with a value smaller than $\max(g_2(X), T_{BWP})$ with respect to inactive bandwidth part B. In this case, $g_2(X)$ may correspond to any function using X as a parameter. In this case, X may be defined based on any method including the method of determining an application delay, described in method 4 and method 5 of the aforementioned sixth embodiment.

6-1th Embodiment

In an embodiment of the disclosure, the terminal may receive a minimum offset value from the base station via DCI transmitted in a currently active bandwidth part, and may determine, based on the received minimum offset value, valid or invalid entries for entries in a time domain resource allocation table configured for each bandwidth part. As described above, the terminal may be indicated with a minimum offset value ($K_{min}$) from the base station via DCI transmitted in currently active bandwidth part A, and if the terminal receives a DCI format for scheduling in bandwidth part B, a scheduling limit of bandwidth part B may be determined based on the $K_{min}$ value. (For example, in consideration of a ratio of a subcarrier spacing of bandwidth part A and a subcarrier spacing of bandwidth part B, $K_{min}'=f(K_{min})=ceil(K_{min}*2^{\mu\_B}/2^{\mu\_A})$ is assumed based on $K_{min}'$ obtained by reconverting $K_{min}$ based on bandwidth part B so that the scheduling limit of bandwidth part B is determined.) That is, if the terminal receives DCI for scheduling of data in bandwidth part B, the terminal may not expect that a scheduling offset value (K) in time domain resource allocation information for data scheduling in bandwidth part B is indicated with a value smaller than $K_{min}'$.

After applying the scheduling limit, all entries existing in the time domain resource allocation table configured in bandwidth part B may not be valid. That is, all scheduling offset (K) values in the time domain resource allocation table configured in bandwidth part B may be smaller than $K_{min}'$. In this case, an additional terminal operation for the DCI format indicating scheduling in bandwidth part B may need to be defined. For example, the following methods may be considered.

Method 1

According to an embodiment, the base station may configured a minimum offset value set including one or multiple minimum offset values (e.g., minimum offset value #1=$K_{min}(1)$ and minimum offset value #2=$K_{min}(2)$) for the terminal via higher layer signaling (e.g., RRC), and may indicate, via L1 signaling (e.g., DCI), one of the minimum offset values configured for the terminal. The base station may configure, for the terminal, the minimum offset value set for each bandwidth part configured for the terminal. For example, minimum offset value set A may be configured in bandwidth part A, and minimum offset value set B may be configured in bandwidth part B. The terminal may be indicated with at least one minimum offset value ($K_{min}$) among minimum offset values in a corresponding minimum offset value set via L1 signaling (e.g., DCI) transmitted in a currently active bandwidth part, and may determine a scheduling limit of the currently active bandwidth part and an inactive bandwidth part, based on the indicated minimum offset value $K_{min}$. The method of determining the scheduling limit of the currently active bandwidth part and the inactive bandwidth part may be based on the aforementioned embodiments. As described above, a valid entry may not exist in the time domain resource allocation table.

In order to solve this problem, in an embodiment, when configuring, for the terminal, the time domain resource allocation table in each bandwidth part, the base station may configure an entry of the time domain resource allocation table in consideration of a maximum value (this is referred to as "maximum minimum-offset-value") among minimum offset values in the minimum offset value set configured in each bandwidth part. The base station may configure the terminal so that there is always an entry having a scheduling offset value greater than or equal to the "maximum minimum-offset-value" in the time domain resource allocation table of each bandwidth part. That is, the time domain resource allocation table of each bandwidth part, which is configured for the terminal by the base station, may be configured so as to have at least one entry having a scheduling offset value greater than or equal to the "maximum minimum-offset-value". The terminal may not expect, from the base station, that scheduling offset values of all entries in the time domain resource allocation table of a specific bandwidth part have a value smaller than the "maximum minimum-offset-value". That is, the base station may determine a configuration value of the time domain resource allocation table to be configured for each bandwidth part, based on minimum offset value set configuration information pre-configured for the terminal for each bandwidth part, thereby, after applying the minimum offset value, ensuring that at least one valid entry is always present in the time domain resource allocation table of the specific bandwidth part.

The terminal may not expect that scheduling offset values of all entries in the time domain resource allocation table of the specific bandwidth part are configured by the base station so as to have a value smaller than the "maximum minimum-offset-value". If scheduling offset values of all entries of the time domain resource allocation table configured for the specific bandwidth part are smaller than the "maximum minimum-offset-value", the terminal may regard the corresponding configuration information as an error and discard the same.

Method 2

According to an embodiment, the base station may configured a minimum offset value set including one or multiple minimum offset values (e.g., minimum offset value #1=$K_{min}(1)$ and minimum offset value #2=$K_{min}(2)$) for the terminal via higher layer signaling (e.g., RRC), and may indicate, via L1 signaling (e.g., DCI), one of the minimum offset values configured for the terminal. The base station may configure, for the terminal, the minimum offset value set for each bandwidth part configured for the terminal. For example, minimum offset value set A may be configured in bandwidth part A, and minimum offset value set B may be configured in bandwidth part B. The terminal may be indicated with at least one minimum offset value ($K_{min}$) among minimum offset values in a corresponding minimum offset value set via L1 signaling (e.g., DCI) transmitted in a currently active bandwidth part, and may determine a scheduling limit of the currently active bandwidth part and an inactive bandwidth part, based on the indicated minimum offset value $K_{min}$. The method of determining the scheduling limit of the currently active bandwidth part and the inactive bandwidth part may be based on the aforementioned embodiments. As described above, a valid entry may not exist in the time domain resource allocation table.

In order to solve this problem, in an embodiment, when configuring a minimum offset value set for the terminal for each bandwidth part, the base station may configure a minimum offset value set including minimum offset values smaller than or equal to a "minimum maximum-scheduling-offset-value" from among scheduling offset values in the time domain resource allocation table configured for each bandwidth part, and may not configure a minimum offset value set including minimum offset values larger than the "minimum maximum-scheduling-offset-value". Here, with respect to the "minimum maximum-scheduling-offset-value", when a maximum value among scheduling offset values in the time domain resource allocation table configured for a specific bandwidth part is referred to as "maximum scheduling offset value", a value corresponding to a minimum value among "maximum scheduling offset values" of each bandwidth part may be referred to as "minimum maximum-scheduling-offset-value". That is, the base station may determine a configuration value of the minimum offset value set to be configured for each bandwidth part, based on time domain resource allocation table information pre-configured for the terminal for each bandwidth part, thereby, after applying the minimum offset value, ensuring that at least one valid entry is always present in the time domain resource allocation table of the specific bandwidth part.

The terminal may not expect that a specific minimum offset value in the minimum offset value set of the specific bandwidth part is configured by the base station so as to have a value larger than the "minimum maximum-scheduling-offset-value". If a specific minimum offset value in a minimum offset value set configured for a specific bandwidth part is larger than a "minimum maximum-offset-value", the terminal may regard the corresponding configuration information as an error and discard the same.

Method 3

According to an embodiment, the base station may configured a minimum offset value set including one or multiple minimum offset values (e.g., minimum offset value #1=$K_{min}$(1) and minimum offset value #2=$K_{min}$(2)) for the terminal via higher layer signaling (e.g., RRC), and may indicate, via L1 signaling (e.g., DCI), one of the minimum offset values configured for the terminal. The base station may configure, for the terminal, the minimum offset value set for each bandwidth part configured for the terminal. For example, minimum offset value set A may be configured in bandwidth part A, and minimum offset value set B may be configured in bandwidth part B. The terminal may be indicated with at least one minimum offset value ($K_{min}$) among minimum offset values in a corresponding minimum offset value set via L1 signaling (e.g., DCI) transmitted in a currently active bandwidth part, and may determine a scheduling limit of the currently active bandwidth part and an inactive bandwidth part, based on the indicated minimum offset value $K_{min}$. The method of determining the scheduling limit of the currently active bandwidth part and the inactive bandwidth part may be based on the aforementioned embodiments. As described above, a valid entry may not exist in the time domain resource allocation table.

In order to solve this problem, in an embodiment, if the terminal receives a DCI format for scheduling in inactive bandwidth part B, and all scheduling offset values of the time domain resource allocation table of bandwidth part B are smaller than a currently assumed minimum offset value (that is, when the currently assumed minimum offset value is applied to bandwidth part B, if all entries of the time domain resource allocation table of bandwidth part B are determined to be invalid), the terminal may assume the currently assumed minimum offset value ($K_{min}$) to be a scheduling offset (K) for data scheduled in bandwidth part B (that is, the terminal may assume that scheduling offset value K in time domain resource allocation information of the data scheduled in bandwidth part B is $K_{min}$). That is, when scheduling, for the terminal, bandwidth part B in which only invalid entries exist, the base station may perform scheduling using scheduling offset value K as the minimum offset value ($K_{min}$) that the terminal currently assumes, and the terminal may expect data to be scheduled with a scheduling offset corresponding to the currently assumed minimum offset value (($K_{min}$) with respect to corresponding bandwidth part B.

Method 3-1

According to an embodiment, the aforementioned [method 3] may be limitedly performed if a default time domain resource allocation table is configured in bandwidth part B or if scheduling offset values of all entries in a time domain table are configured to 0. The default time domain resource allocation table may refer to a time domain resource allocation table that the terminal assumes in default when no time domain resource allocation table is configured for the terminal by the base station via higher layer signaling.

Method 4

According to an embodiment, the base station may configured a minimum offset value set including one or multiple minimum offset values (e.g., minimum offset value #1=$K_{min}$(1) and minimum offset value #2=$K_{min}$(2)) for the terminal via higher layer signaling (e.g., RRC), and may indicate, via L1 signaling (e.g., DCI), one of the minimum offset values configured for the terminal. The base station may configure, for the terminal, the minimum offset value set for each bandwidth part configured for the terminal. For example, minimum offset value set A may be configured in bandwidth part A, and minimum offset value set B may be configured in bandwidth part B. The terminal may be indicated with at least one minimum offset value ($K_{min}$) among minimum offset values in a corresponding minimum offset value set via L1 signaling (e.g., DCI) transmitted in a currently active bandwidth part, and may determine a scheduling limit of the currently active bandwidth part and an inactive bandwidth part, based on the indicated minimum offset value $K_{min}$. The method of determining the scheduling limit of the currently active bandwidth part and the inactive bandwidth part may be based on the aforementioned embodiments. As described above, a valid entry may not exist in the time domain resource allocation table.

In order to solve this problem, in an embodiment, when indicating a minimum offset value for the terminal via L1 signaling (e.g., DCI), the base station may indicate a minimum offset value always smaller than or equal to a "minimum maximum-scheduling-offset-value" from among scheduling offset values in the time domain resource allocation table configured for each bandwidth part, and may not indicate a minimum offset value larger than the "minimum maximum-scheduling-offset-value". Here, with respect to the "minimum maximum-scheduling-offset-value", when a maximum value among scheduling offset values in the time domain resource allocation table configured for a specific bandwidth part is referred to as "maximum scheduling offset value", a value corresponding to a minimum value among "maximum scheduling offset values" of each bandwidth part may be referred to as "minimum maximum-scheduling-offset-value". That is, the base station may determine a minimum offset value to be indicated via L1 signaling (e.g., DCI), based on information of the time domain resource allocation table pre-configured for the terminal for each bandwidth part, thereby, after applying the minimum offset value, ensuring that at least one valid entry is always present in the time domain resource allocation table of the specific bandwidth part.

The terminal may not expect that the minimum offset value indicated by the base station via L1 signaling (e.g., DCI) is indicated with a value larger than the "minimum maximum-scheduling-offset-value". If a minimum offset value received by the terminal via L1 signaling (e.g., DCI) is larger than a "minimum maximum-offset-value", the terminal may regard the received DCI as an error and discard or ignore contents of the DCI.

Figure 13:
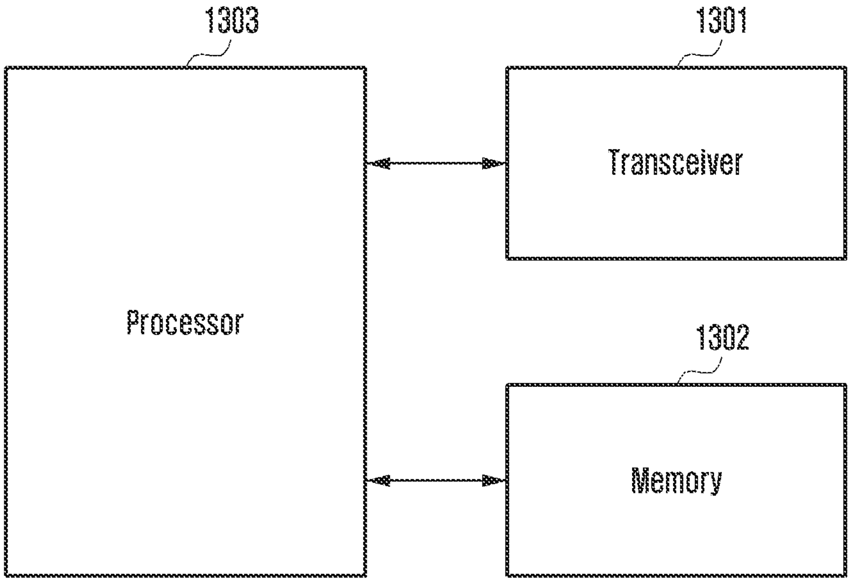
FIG. 13 is a block diagram illustrating a structure of a terminal according to an embodiment of the present disclosure.
Figure 14:
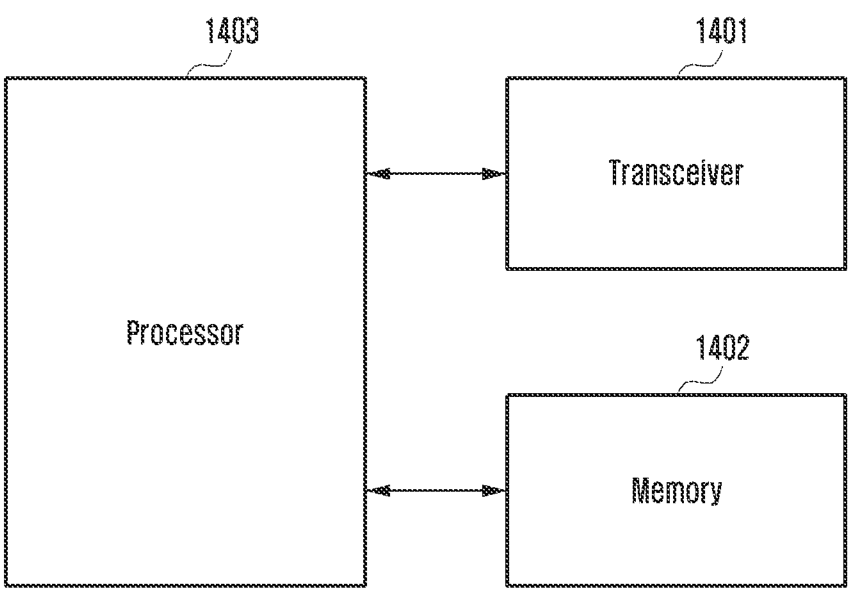
FIG. 14 is a block diagram illustrating a structure of a base station according to an embodiment of the disclosure.

In order to perform the aforementioned embodiments of the disclosure, transceivers, memories, and processors of a terminal and a base station are illustrated in FIG. 13 and FIG. 14, respectively. The aforementioned embodiments show transmission/reception methods of a base station and a terminal, for reducing power consumption of the terminal. In order to perform the methods, each of transceivers, memories, and processors of the base station and the terminal should operate according to the embodiments.

FIG. 13 illustrates a structure of a terminal according to an embodiment of the disclosure.

Referring to FIG. 13, a terminal may include a transceiver 1301, a memory 1302, and a processor 1303. However, the elements of the terminal are not limited to the aforementioned examples. For example, the terminal may include more elements or fewer elements than the aforementioned elements. In addition, the transceiver 1301, the memory 1302, and the processor 1303 may be implemented in the form of a single chip.

According to an embodiment, the transceiver 1301 may transmit a signal to or receive a signal from a base station. The signal may include control information and data. To this end, the transceiver 1301 may include an RF transmitter configured to perform up-conversion and amplification of a frequency of a transmitted signal, an RF receiver configured to perform low-noise amplification of a received signal and perform down-conversion of a frequency, and the like. Further, the transceiver 1301 may receive a signal via a wireless channel, may output the signal to the processor 1303, and may transmit, through the wireless channel, a signal output from the processor 1303.

According to an embodiment, the memory 1302 may store programs and data necessary for operations of the terminal. The memory 1302 may store control information or data included in a signal transmitted or received by the terminal. The memory 1302 may include a storage medium or a combination of storage media, such as a ROM, a RAM, a hard disk, a CD-ROM, and a DVD. Further, the memory 1302 may include multiple memories. According to an embodiment of the disclosure, the memory 1302 may store a program for receiving and controlling an operation for reducing power consumption of the terminal.

According to an embodiment of the disclosure, the processor 1303 may control a series of procedures so that the terminal may operate according to the aforementioned embodiments of the disclosure. For example, the processor 1303 may control a power consumption reduction operation of the terminal according to embodiments of the disclosure.

Specifically, the processor 1303 may control respective elements of the terminal, which have operations of receiving configuration information on a PDCCH from a base station, monitoring the PDCCH from the base station based on the configuration information on the PDCCH from the base station, detecting the PDCCH based on the monitoring, and applying a received control content.

The processor 1303 may include multiple processors and may perform, by executing a program stored in the memory 1202, a method of reducing power consumption of the terminal according to embodiments of the disclosure.

FIG. 14 illustrates a structure of a base station according to an embodiment of the disclosure.

Referring to FIG. 14, a base station may include a transceiver 1401, a memory 1402, and a processor 1403. However, the elements of the base station are not limited to the above examples. For example, the base station may include more elements or fewer elements than the aforementioned elements. In addition, the transceiver 1401, the memory 1402, and the processor 1403 may be implemented in the form of a single chip.

According to an embodiment, the transceiver 1401 may transmit a signal to or receive a signal from a terminal. The signal may include control information and data. To this end, the transceiver 1401 may include an RF transmitter configured to perform up-conversion and amplification of a frequency of a transmitted signal, an RF receiver configured to perform low-noise amplification of a received signal and perform down-conversion of a frequency, and the like. Further, the transceiver 1401 may receive a signal via a wireless channel, may output the signal to the processor 1403, and may transmit, through the wireless channel, a signal output from the processor 1403.

According to an embodiment, the memory 1402 may store programs and data necessary for operations of the base station. The memory 1402 may store control information or data included in a signal transmitted or received by the base station. The memory 1402 may include a storage medium or a combination of storage media, such as a ROM, a RAM, a hard disk, a CD-ROM, and a DVD. Further, the memory 1402 may include multiple memories. According to an embodiment of the disclosure, the memory 1402 may store a program for the base station to generate and transmit control information for reducing power consumption of a terminal.

According to an embodiment of the disclosure, the processor 1403 may control a series of procedures so that the base station may operate according to the aforementioned embodiments of the disclosure. For example, the processor 1403 may control each element of the base station to generate and transmit control information for reducing power consumption of a terminal.

The processor 1403 may include multiple processors and may perform, by executing programs stored in the memory 1402, a method of generating control information for reducing power consumption of a terminal and transmitting a downlink control channel according to embodiments of the disclosure.

The methods according to embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Further, the above respective embodiments may be employed in combination, as necessary. For example, a part of one embodiment of the disclosure may be combined with a part of another embodiment to operate a base station and a terminal. Further, the embodiments of the disclosure may be applied to other communication systems, and other variants based on the technical idea of the embodiments may also be implemented. For example, the embodiments may be applied to LTE, 5G, or NR systems.

The invention claimed is:

1. A method of a terminal in a communication system, the method comprising:

receiving, from a base station, first downlink control information (DCI) in slot n, wherein the first DCI indicates a first minimum offset value;

identifying an application delay for applying the first minimum offset value; and applying the first minimum offset value in slot n+k, where k is the application delay, wherein, in a time interval corresponding to the application delay from slot n, second DCI indicating another minimum offset value having a value different from the first minimum offset value is not received, and wherein the application delay is identified based on a subcarrier spacing of a physical downlink control channel (PDCCH), a subcarrier spacing of a physical downlink shared channel (PDSCH), and a symbol position of the first DCI in slot n.

2. The method of claim 1, wherein the first DCI indicating the first minimum offset value is DCI format 0_1 or DCI format 1_1.

3. The method of claim 1, further comprising receiving, from the base station, a set of candidate values for $K_{0min}$ and a set of candidate values for $K_{2min}$, respectively, wherein $K_{0min}$ is a minimum offset value associated a physical downlink shared channel (PDSCH), and $K_{2min}$ is a minimum offset value associated with a physical uplink shared channel (PUSCH).

4. A method of a base station in a communication system, the method comprising:

transmitting, to a terminal, first downlink control information (DCI) in slot n, wherein the first DCI indicates a first minimum offset value;

identifying an application delay for applying the first minimum offset value; and applying the first minimum offset value in slot n+k, where k is the application delay, wherein, in a time interval corresponding to the application delay from slot n, second DCI indicating another minimum offset value having a value different from the first minimum offset value is not transmitted, and wherein the application delay is identified based on a subcarrier spacing of a physical downlink control channel (PDCCH), a subcarrier spacing of a physical downlink shared channel (PDSCH), and a symbol position of the first DCI in slot n.

5. The method of claim 4, wherein the first DCI indicating the first minimum offset value is DCI format 0_1 or DCI format 1_1.

6. The method of claim 4, further comprising transmitting, from the base station, a set of candidate values for $K_{0min}$ and a set of candidate values for $K_{2min}$, respectively, wherein $K_{0min}$ is a minimum offset value associated a physical downlink shared channel (PDSCH), and $K_{2min}$ is a minimum offset value associated with a physical uplink shared channel (PUSCH).

7. A terminal of a communication system, the terminal comprising:

a transceiver; and a controller configured to:

receive, from a base station, first downlink control information (DCI) in slot n, wherein the first DCI indicates a first minimum offset value, identify an application delay for applying the first minimum offset value, and apply the first minimum offset value in slot n+k, wherein k is the application delay, wherein, in a time interval corresponding to the application delay from slot n, second DCI indicating another minimum offset value having a value different from the first minimum offset value is not received, and wherein the application delay is identified based on a subcarrier spacing of a physical downlink control channel (PDCCH), a subcarrier spacing of a physical downlink shared channel (PDSCH), and a symbol position of the first DCI in slot n.

8. The terminal of claim 7, wherein the first DCI indicating the first minimum offset value is DCI format 0_1 or DCI format 1_1.

9. The terminal of claim 7, further comprising receiving, from the base station, a set of candidate values for $K_{0min}$ and a set of candidate values for $K_{2min}$, respectively, wherein $K_{0min}$ is a minimum offset value associated a physical downlink shared channel (PDSCH), and $K_{2min}$ is a minimum offset value associated with a physical uplink shared channel (PUSCH).

10. A base station of a communication system, the base station comprising:

a transceiver; and a controller configured to:

transmit, to a terminal, first downlink control information (DCI) in slot n, wherein the first DCI indicates a first minimum offset value, identify an application delay for applying the first minimum offset value, and apply the first minimum offset value in slot n+k, where k is the application delay, wherein, in a time interval corresponding to the application delay from slot n, second DCI indicating another minimum offset value having a value different from the first minimum offset value is not transmitted, and wherein the application delay is identified based on a subcarrier spacing of a physical downlink control channel (PDCCH), a subcarrier spacing of a physical downlink shared channel (PDSCH), and a symbol position of the first DCI in slot n.

11. The base station of claim 10, wherein the first DCI indicating the first minimum offset value is DCI format 0_1 or DCI format 1_1.

* * * * *